(12) United States Patent
Hess et al.

(10) Patent No.: US 10,057,227 B1
(45) Date of Patent: Aug. 21, 2018

(54) DETERMINATION OF AUTHENTICATION MECHANISM

(71) Applicant: Amazon Technologies, Inc., Seattle, WA (US)

(72) Inventors: Blake Parker Hess, Renton, WA (US); Leo Parker Dirac, Seattle, WA (US); Alejandro Fonseca, Seattle, WA (US); Shariq Siddiqui, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 90 days.

(21) Appl. No.: 14/671,946

(22) Filed: Mar. 27, 2015

(51) Int. Cl.
    *H04L 29/06* (2006.01)
    *H04L 29/08* (2006.01)
    *G06N 99/00* (2010.01)

(52) U.S. Cl.
    CPC .......... *H04L 63/08* (2013.01); *G06N 99/005* (2013.01); *H04L 63/10* (2013.01); *H04L 67/22* (2013.01)

(58) Field of Classification Search
    CPC ........ H04L 63/08; H04L 63/10; H04L 67/22; G06N 99/005
    See application file for complete search history.

(56) References Cited

U.S. PATENT DOCUMENTS

| | | | | |
|---|---|---|---|---|
| 9,098,699 B1 * | 8/2015 | Zaslavsky | ............. | G06F 21/552 |
| 9,262,642 B1 * | 2/2016 | Roth | ............. | G06F 21/62 |
| 9,426,139 B1 * | 8/2016 | McClintock | ............. | H04L 63/08 |
| 9,548,963 B2 * | 1/2017 | Albisu | ............. | H04L 63/0272 |
| 2014/0047510 A1 * | 2/2014 | Belton | ............. | H04L 9/32 726/4 |
| 2014/0059663 A1 * | 2/2014 | Rajshekar | ............. | H04L 63/08 726/6 |
| 2014/0189829 A1 * | 7/2014 | McLachlan | ............. | G06Q 20/4014 726/6 |
| 2014/0281539 A1 * | 9/2014 | Faltyn | ............. | H04L 63/08 713/168 |
| 2015/0039513 A1 * | 2/2015 | Adjaoute | ............. | G06Q 20/4016 705/44 |
| 2015/0128205 A1 * | 5/2015 | Mahaffey | ............. | H04L 63/20 726/1 |
| 2015/0347734 A1 * | 12/2015 | Beigi | ............. | G06F 21/32 713/155 |
| 2015/0363582 A1 * | 12/2015 | Sheller | ............. | G06F 21/31 726/17 |
| 2016/0110528 A1 * | 4/2016 | Gupta | ............. | G06F 21/31 726/19 |
| 2016/0127808 A1 * | 5/2016 | Wong | ............. | H04M 3/36 379/112.04 |

* cited by examiner

*Primary Examiner* — Mohammad A Siddiqi
(74) *Attorney, Agent, or Firm* — Davis Wright Tremaine LLP

(57) ABSTRACT

A user initializes multi-factor authentication for a user account, wherein the user account is accessed from multiple user devices. User behavior data is stored in response to receiving login credentials for one of the multiple user devices and the user behavior data is provided as input criteria for a statistical model or machine-learning algorithm. The statistical model or machine-learning algorithm may determine, based on a set of rules, an ideal secondary user device for use in receiving a multi-factor authentication code. The secondary user device receives the multi-factor authentication code without further requests made by the user.

20 Claims, 11 Drawing Sheets

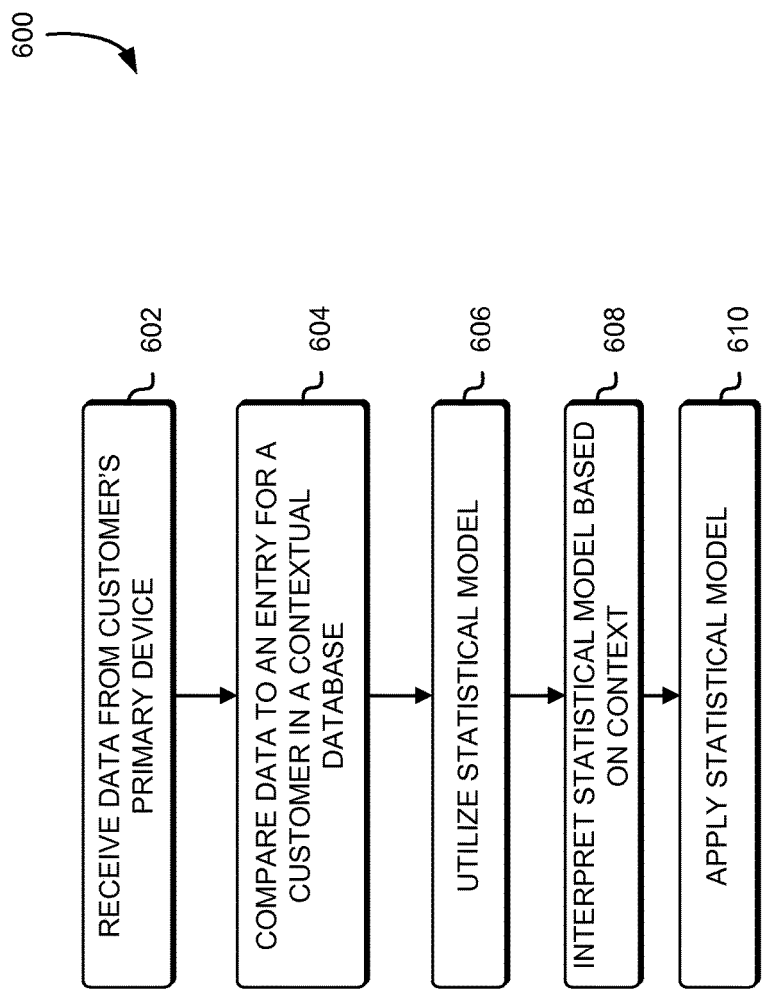

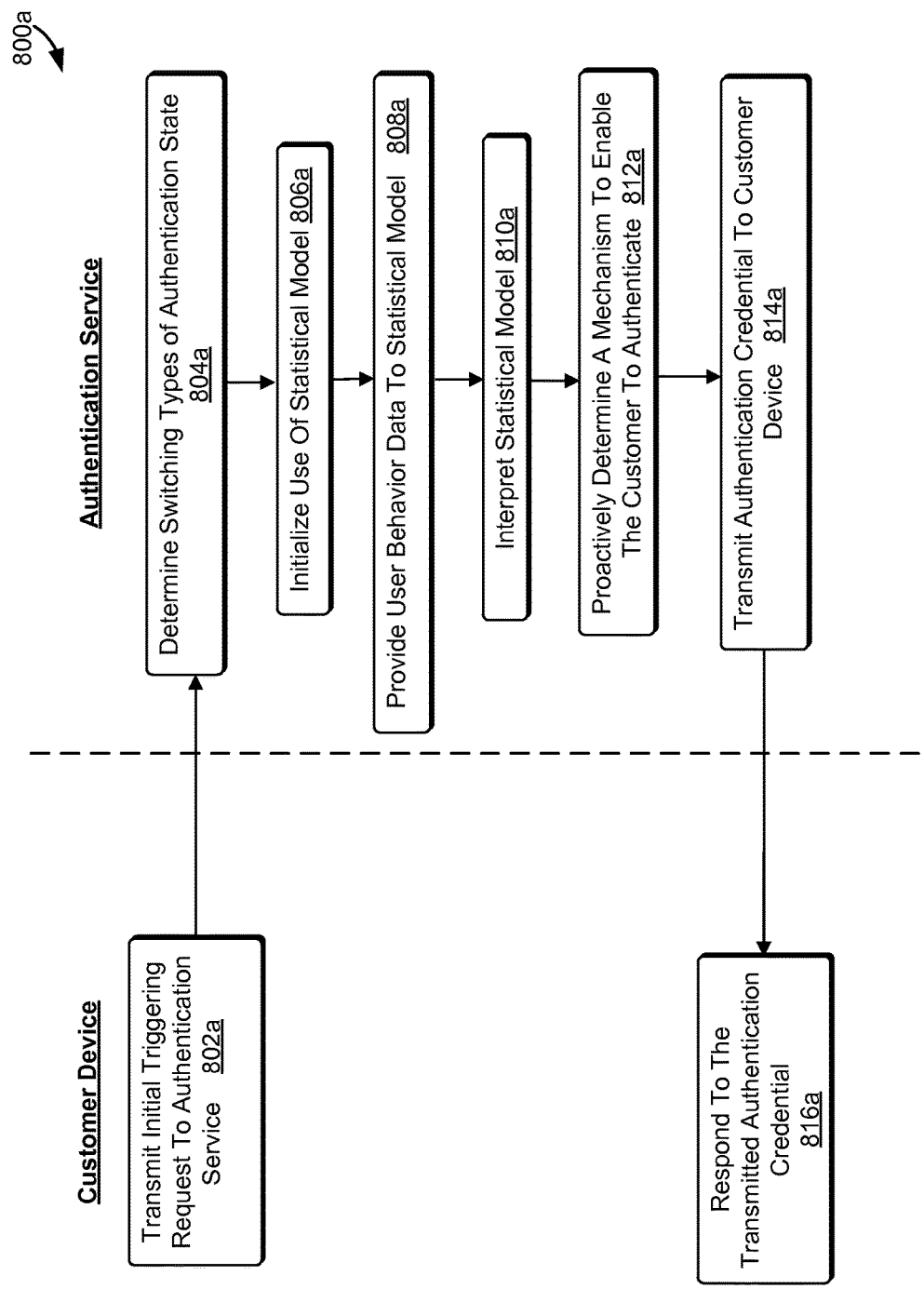

DETERMINATION OF AUTHENTICATION MECHANISM

BACKGROUND

The security of computing resources and associated data is of high importance in many contexts. As an example, organizations often utilize networks of computing devices to provide a robust set of services to their users. Networks often span multiple geographic boundaries and often connect with other networks. An organization, for example, may protect its networks using different authentication methods for user access. To enhance data security, numerous techniques have been developed. For example, the use of username and password combinations has become ubiquitous in various access control contexts.

Additional techniques are also often used in addition to or instead of usernames and passwords. For resources that require greater security, more complex methods are generally advisable; for example, multi-factor authentication ("MFA") or two-factor authentication, which requires a user to provide two or more types of credentials in order to gain access to the network resource. Generally, MFA combines two or more independent user credentials, one that the user has knowledge of (e.g., a username/password) and one that the user is provided or something the user possess (e.g., a security token), thereby making it more difficult for unauthorized access to a physical location, computing device, network, database, etc.

MFA commonly includes a user providing a username/password combination to a network resource provider and receiving an authentication code in response, where the authentication code is transmitted to a user's predetermined or preauthorized device (e.g., receiving the authentication code via a short message service to a mobile device). Conventional implementations of MFA are often inflexible and, as a result, can cause an unfavorable user experience in certain situations. For example, MFA may require a code be sent to a mobile device, but the mobile device may lack network connectivity in some locations. As another example, a user may have multiple mobile devices and may not have the same device with him/herself at all times. Consequently, MFA, while increasing security, can make authentication processes difficult and, at some times, impossible.

BRIEF DESCRIPTION OF THE DRAWINGS

Various embodiments in accordance with the present disclosure will be described with reference to the drawings, in which:

FIG. 6 is an illustrative example of a process for applying a statistical model in accordance with at least one embodiment;

FIG. 8A is a swim diagram illustrating the interactions between a customer device and an authentication service in accordance with at least one embodiment;

DETAILED DESCRIPTION

Figure 1:
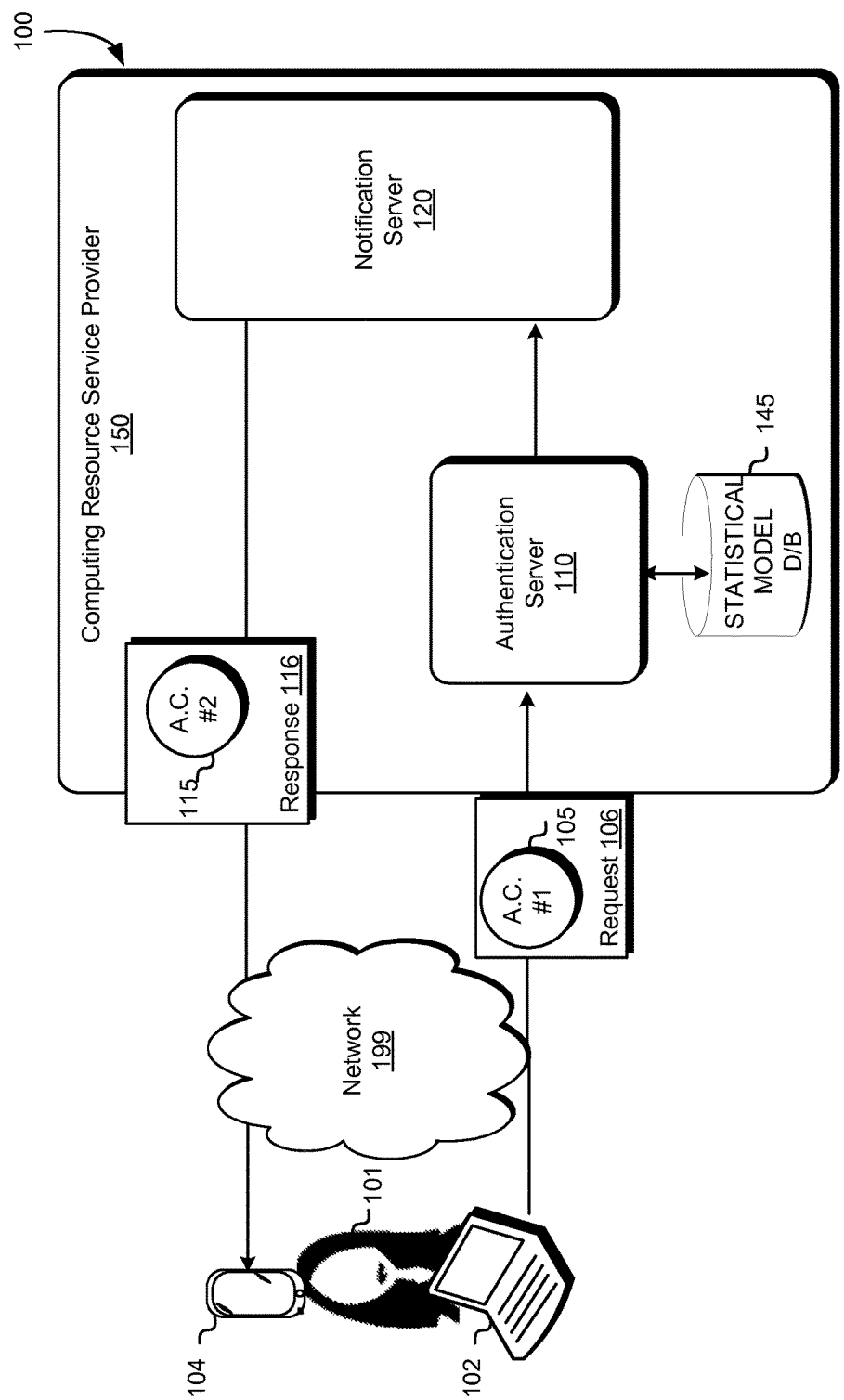
FIG. 1 shows an illustrative example of an environment in which various embodiments may be practiced.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include methods, systems, and computer-readable mediums related to the enablement and use of multi-factor authentication ("MFA") management based on customer device/mechanism preferences. The techniques presented herein include identifying factors and/or patterns in response to a user failing to receive a code provided to a first mechanism, thereby requiring the user to specifically request a secondary mechanism be used. In some examples, a service provider may utilize changes in user preferences, changes in user requests, user request metadata, and the like to detect factors to automatically determine which secondary user mechanisms should be used without a user requesting a second mechanism.

In an example, a user or customer of a computing resource service provider communicates, via an interface, with the service provider to enable multi-factor authentication for a particular account of the user. The user, through the interface, may specify a device or other mechanism within the user's control, such as a personal cellular telephone, computer, laptop, tablet, or landline telephone that may be utilized to authenticate a user of the computing resource service. The user may select the different mechanisms or devices as being a primary, secondary, tertiary, etc. ways of receiving an authentication code from the service provider, such that when the user requests that an authentication code be transmitted to another device, the service provider may select the devices in the elected order or the user may specify which mechanism for the service provider to use.

Once the user has enabled multi-factor authentication for a particular user account and has specified mechanisms and/or devices for receiving an authentication code, a user may be required to provide a first set of authentication credentials, as well as the multi-factor authentication code to access a network resource of the computing resource service. For instance, a user may access an authentication service, which may be associated with the service provider or managed by the service provider, before being allowed to access the network resource. In an example, the service provider or authentication service initially only enables the user to provide the user's set of credentials for verification. If the service provider determines, based on an examination of the user's provided credentials, that the credentials are valid, the service provider may transmit or supply the user with a second set of credentials and prompt the user to provide the multi-factor second set of credentials, usually an authentication code. Once the multi-factor authentication code has been authenticated, the user may be granted access to the network resource.

In this manner, the user may receive the authentication code based on his/her elected mechanism for receiving such a code. However, when the authentication code is transmitted to a device such that the code is not accessible to the user (e.g., because the device lacks connectivity to receive the code), the user may request the code be transmitted again and choose the device to which it should be sent. As the user repeats this decision-making process of requesting the code to be sent to a different device, this choice, along with additional information, may be stored by the service provider to build a user behavior profile. The user behavior profile may then be analyzed according to machine learning or statistical models in order to determine which secondary device the user generally requests based on the user's behavior. This analysis enables the service provider to identify patterns of when the user desires that a different device be used, and allows the service provider to proactively utilize the different device without the need for the user making a request to do so.

An example may further include classifying user behavior information and using classifications of the user behavior information to determine how to provide an authentication code to a desired user device when the user behavior information changes. A statistical model may further be applied to the classifications of user behavior information to determine whether a change in user behavior should be used to change the determined user device. Additional information and/or classifications may be used based on changes in user requests in order to determine how to process the requests. In some examples, user behavior and user device metadata are used to track requests from a user's primary device. A user's primary device may record information, such as a time of day of the request, the cellular reception or signal strength of the device at the time of the request, the location of the device, the type of device, and the like, and provide that information to the computing resource service provider. The received information may further be used, in addition to the user behavior, to proactively determine the appropriate secondary user device to which to send the authentication code for the multi-factor authentication.

In addition, the techniques described and suggested herein facilitate additional technical advantages. For example, a customer may be able to enable multi-factor authentication for a customer account and receive an authentication code from a computing resource service provider on a device or via a mechanism that is appropriate and/or desired for that user, under the specific conditions in which the user has made the request. This, in turn, may provide additional security for the customer account without requiring any additional work or resources on the part of the customer.

FIG. 1 is an example embodiment of an environment 100 for implementing aspects in accordance with various embodiments. In the environment 100, a customer user 101 may utilize multiple devices, such as a personal computer and a cellular telephone, for accessing the same user account of a computing resource service provider 150 and for using multi-factor authentication for that account.

FIG. 1, for example, shows an illustrative example of an environment in which an authentication code is verified by an authentication server 110 of the computing resource service provider 150 for which access is desired by a user. The environment 100 further includes a first user device 102, a computing resource service provider 150, an authentication server 110, a notification server 120, and a second user device 104. The first user device 102 is illustrated as a notebook computer and the second user device 104 is illustrated as a mobile phone including an advance mobile operating system, although the user devices may be any device such as described elsewhere herein. The computing resource service provider 150 may comprise a collection of computing devices, collectively configured to provide a service to one or more users through corresponding devices used by the users, such as user devices 102 and 104. The service provider may, for instance, provide a website or a backend system supporting a mobile or other application executing on the user devices; the service provider may further provide social networking services, an electronic commerce website, its own other type of website, and/or other services. The notification server 120 may be a computer system comprising a collection of computing devices collectively configured to manage notifications for the service provider 150.

In an embodiment as illustrated in FIG. 1, the user device 102 provides an authentication credential 105, which may be transmitted with a user request 106, to the authentication server 110 for authenticating with the authentication server and gaining access to services for which authentication is required. The authentication credential 105 may be provided, for example, as a result of user input provided to the user device 102 by a user 101 of the user device 102.

The authentication server 110 may make an authentication decision determined based at least in part on the authentication credential 105 and generate an authentication response which, in an embodiment, is a communication or collection of communications that indicate whether authentication was successful (e.g., whether the information contained within the authentication object was sufficient for authentication). The generated authentication response may then be provided from the notification server 120. If the authentication response from the authentication server indicates that authentication was successful, the service provider 150 may allow the user device 102 to access services (e.g., website functionality) for which authentication was required.

Similarly, if the authentication response indicates that authentication was not successful, or if the authentication server 110 does not receive an authentication response, the service provider 150 may continue to restrict access to services for which authentication is required, although access to other services such as browsing portions of a website may remain to be permitted. Whether the authentication response indicates that authentication is successful or unsuccessful, the authentication server 110 provides the response to the notification server 120. When the authentication server validates the user credentials as valid, the notification server may further provide a response to the second user device 104 providing a second authentication credential, such as an authentication code, to be used by the user for multi-factor authentication (described in more detail below in reference to FIG. 2).

The authentication server 110 may further be operably interconnected with a statistical model 145, which may be used to provide or determine a second user device in preparation for transmitting additional information to the second user device (e.g., a multi-factor authentication code). The authentication service 110 may utilize user behavior data in a statistical model, stored in a statistical model database 145, in order to identify the second user device without a user having to send a second request for a secondary multi-factor authentication code to be transmitted to the second user device 104. For example, the authentication service may send information to a client, such as a web client or front-end web service, and the client transforms the information (e.g., by putting the information into a hash function, which may be a keyed hash function where the client has the key). The client may further use the output of the function in an authentication claim (i.e., the user provides a credential that is derived from information the service gave it).

As illustrated in FIG. 1, the computing resource service provider 150, in various embodiments, includes an authentication server 110 and a notification server 120. The authentication server 110, in an embodiment, is a computer system (i.e., collection of computing resources) configured to perform operations involved in authentication of users. For instance, services of the computing resource service provider may provide information from a user to the authentication server to receive information in return that indicates whether the user requests are authentic. As used, unless otherwise stated or clear from context, the term "service" may be understood to be a computer system program, process, client, server, service, application, module, operating system entity, controlling domain, communication node or collection of these and/or other such computer system entities. A "service" may be a client and/or a server and in some embodiments may be configured to send and/or receive communications, data, requests, and/or other such requests from other services within the computer system.

Further illustrated in the environment 100 illustrated in FIG. 1, the notification server 120 may comprise a collection of computing resources collectively configured to provide a web service or other interface and browser-based management console. The management console can be used to configure topics for which customers seek to receive notifications, configure applications (or people), subscribe clients to the topics, publish messages, or configure delivery of the messages over clients' protocol of choice (i.e., hypertext transfer protocol (HTTP), e-mail and short message service (SMS), among others). The notification server 120 may provide notifications to clients using a "push" mechanism without the need to check periodically or "poll" for new information and updates.

Figure 2:
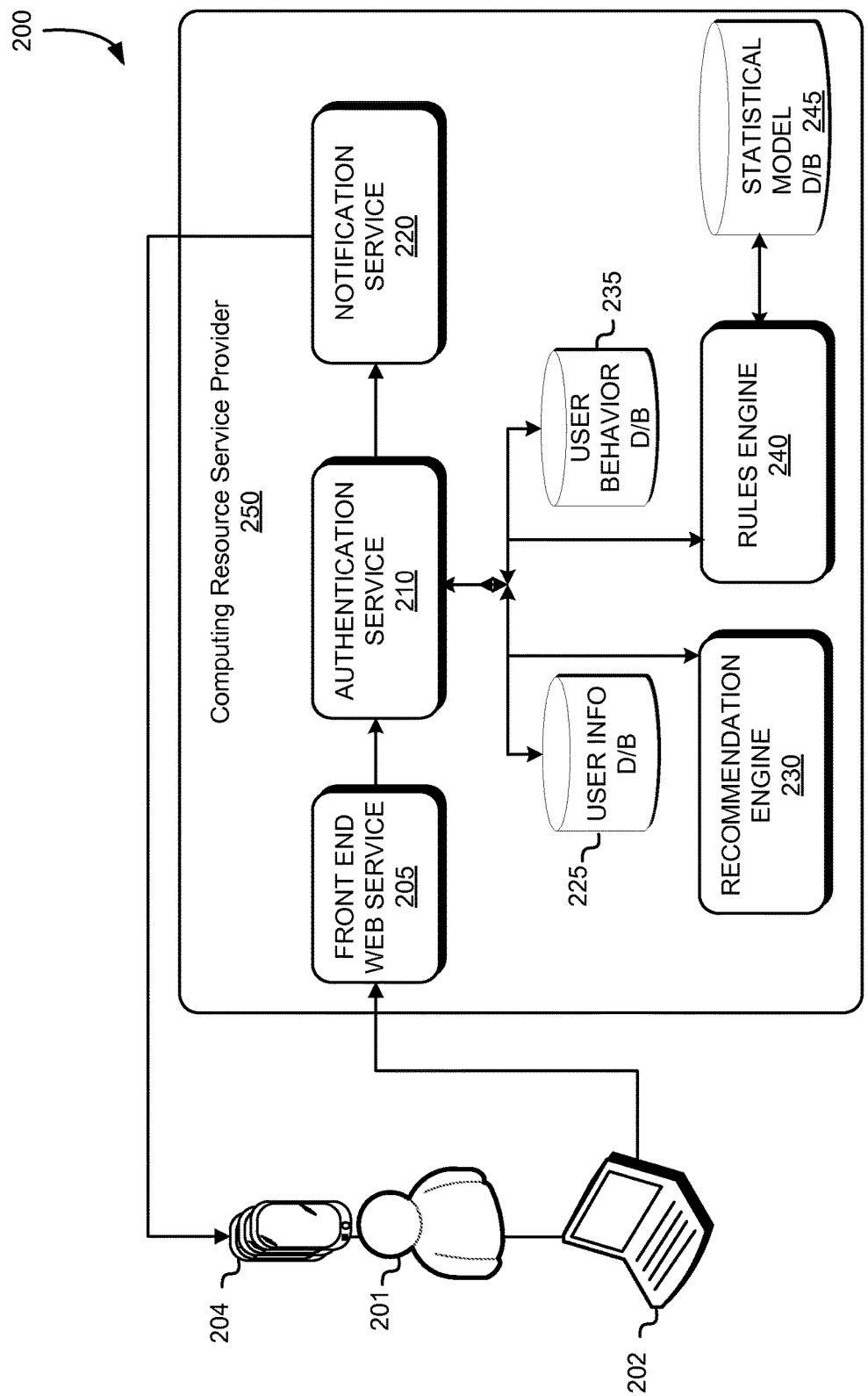
FIG. 2 is an illustrative example of an environment in which multi-factor authentication is enabled in accordance with various embodiments.

FIG. 2 is an illustrative example of an environment 200 in which multi-factor authentication is enabled in accordance with various embodiments. In the environment 200, a customer user 201 accesses a computing resource service provider 250 via two devices, a personal computer 202 and a smart telephone (or any number of secondary devices) 204. The environment 200 further includes the user devices being operably interconnected to a computing resource service provider 250 via a network (not shown).

The computing resource service provider 250, similar to the above described computing resource service provider 150 as described and depicted in connection with FIG. 1, may comprise a collection of computing devices, collectively configured to provide a service to one or more users through corresponding devices used by the users. Returning to FIG. 2, the service provider 250 comprises a front-end web service 205, an authentication service 210, a notification service 220, and a rules engine 240. The authentication service 210 and the rules engine 240 are operably interconnected with, e.g., may transmit, receive, obtain, and retrieve information from, user information database 225, user behavior database 235, and statistical model database 245.

The front-end web service 205 may be configured to receive customer requests and provide responses to the requests. The front-end web service 205 may also include an interface that enables the receipt and processing of requests from other services of a service provider. In order to process the requests, the front-end web service may interact with various other components, such as the authentication service 210, which may comprise a collection of computing resources collectively configured to make determinations regarding authentication to enable the front-end web service to deny or fulfill requests as appropriate. The authentication service 210 may be configured to distribute information to multiple additional services, databases, and the like for scalability reasons.

In an embodiment, when the front-end web service 205 receives a request, the front-end web service communicates with the authentication service 210 to determine whether the request is authentic. The request may, for instance, include authentication credentials, such as a username and password shared between the user and an authentication system such as described above in connection with FIG. 1. The authentication service 210 may transmit information via an authentication system interface, which enables the authentication service to obtain determinations from an authentication server such as described above in connection with FIG. 1 whether the request is authentic. In operating to determine whether requests are authentic, the authentication service 210 may cache certain information in order to enable the authentication service to make a determination regarding authentication.

The authentication service 210 may confirm validity of a username and password, or other primary credentials, provided by a user by retrieving user login credentials from the user information database 225. The user information database 225 may be further divided among multiple databases, such as a database to store just user phone numbers. The user information database may include data related to a user's account credentials in an encrypted or unencrypted form, user account information related to multi-factor authentication enablement status, registered trusted devices (e.g., devices that do not require multi-factor authentication), and registered types of secondary devices to be used for transmitting an authentication code to the secondary device. Once the authentication service 210 confirms validity of the user, the authentication service 210 can initialize a rules engine 240 for determining user device preferences for receiving multi-factor authentication codes. The rules engine 240 may be a computer system or component thereof, such as a programming module of the authentication service, or a separate service configured to transmit and receive data to and from the authentication service or other services of the computing resource service provider 250.

The authentication service may be configured to retrieve data from a database, such as the user behavior database 235, provide the user behavior data, or some processed form of the user behavior data, to the rules engine 240. The authentication service may further be configured to transmit and receive data from a recommendation engine 230, which may be operably interconnected to the user information database 225, the user behavior database 235, and/or the rules engine 240. The recommendation engine 230, which may be a computer, server, or the like, may be configured to provide a user with recommendations of secondary devices or mechanisms to use for authentication purposes based on previous user choices, other customer choices, or additional information that has been positive or productive in the past. The recommendation engine may further be configured to recommend an authentication mechanism based on the type of searches the user is performing. For example, if multiple people are sharing a same account, the authentication service and/or the recommendation service may determine or suggest the authentication mechanism for the user based on the user's search habits, current cart items, or the like. The recommendation engine 230 may further be configured to employ a decision tree or statistical model, including, for example, user behavior data and/or external source data, to improve possible recommendations for users.

In alternative example embodiments, the front-end web service may retrieve data from a database, or processed form of the user behavior data and/or user information data, and provide the retrieved data to the authentication service in order to authenticate the credentials that are received. The authentication service may further store user behavior information in a user behavior database 235, wherein the user behavior data is contextual data related to the user's authentication practices over a period of time and the database is a contextual database for storing entries for a customer. The rules engine may receive current (e.g., active) user behavior data from a user's primary device and compare that data to the user's contextual data (e.g., previous user behavior stored in the user behavior database). In some example embodiments, the rules engine may utilize a customer-specific statistical model and/or machine learning algorithms for comparing the current user behavior data with the user's contextual behavior data in order to identify an ideal secondary user device to provide the multi-factor authentication code to (described in detail below in connection to FIG. 5).

Once a secondary user device that has the highest probability of receiving the code is determined (e.g., a device determined by some ranking mechanism with configurable and/or selectable weighting), the rules engine provides the information, specifically, the type of device (e.g., landline telephone) and the type of mechanism (e.g., voice call), to the authentication service 210, or alternatively directly to the notification service 220. The notification service 220 transmits a response message to the secondary user device selected by the rules engine, where the response message includes secondary credentials, such as a multi-factor authentication code. Example embodiments may include secondary mechanisms or secondary multi-factor authentication mechanisms, which may be a method of receiving an MFA code or authentication mechanism such as short message service (SMS) messages, voice calls to a telephone, a login approval (push notifications in an application installed on the device), an authenticator application installed on the device, a notification on the same primary device transmitted via a different delivery or communication channel (e.g., for a device with two or more subscriber identification module (SIM) cards), transmission of an audio signal via a device microphone, a visual message on a wearable device, and the like. Further example embodiments may include secondary multi-factor authentication devices or single-factor authentication mechanisms, which may be a device on which to receive the secondary MFA one-time password (OTP) or other authentication action such as a cellular telephone, a landline telephone, a tablet, a smart watch, a laptop computer, a desktop computer, a wearable technology with an optical head-mounted display, a smart television, a set-top box, a voice-command device (e.g., a continuously listening or monitoring device activated upon a wake word or remote control), and the like.

In alternative example embodiments, data may be updated or the model may be updated in real-time, where the data may be processed immediately or the model may be updated immediately (e.g., as it happens). For example, in the context of a system that processes data, real-time or near real-time may include processing the data as it is received (versus storing/persisting the data as it is received and processing that data later on), processing non-buffered data, or non-cached data. Further examples may include transforming the data and/or model without intentional delay, given the processing limitations of the system and a time required to accurately receive the data or processing the data fast enough to keep up with an input data stream. Further example embodiments may include data, statistical models, rules engines, and other components being updated in near real-time; for example, this may include the data being updated substantially immediately, where substantially includes a measurement of completion (e.g., how much data is updated, how much time is needed to process or update the data compared to real-time processing) and/or substantially may include a measurement of improvement (e.g., how much did the data or update improve the existing data after the update occurred).

Further example embodiments of FIG. 2 may include enabling a user to read the code (which may be sent to a second device 204, generated by the second device 204, and/or based on a seed value transmitted by a notification service 220) from a display of the second device 204. The code read from the display may be manually entered into the primary device 202. In alternative example embodiments, the code could be transmitted by short-range communication; in addition to near field communication (NFC), other means for short-range inter-device communication may also be utilized in accordance with the systems and methods of the present disclosure. Such compatible technologies include, but are not limited to, induction wireless, infrared wireless (such as technologies operating according to specifications and protocols provided by the Infrared Data Association (IrDA)) or ultra-wideband formats. In some embodiments, first and second devices may utilize short-range, low-power and high-frequency radio transmissions, such as Bluetooth®. In still other embodiments, the first and second devices may support acoustic-based data transfer. For example, the first device may include software components and a speaker that enable the first device to broadcast data to the second device as sound waves, while the second device may include software components and microphone that enable the second device to receive the data embedded in the sound waves. Thus, one or more of radio signal-based data transfer (e.g., NFC or Bluetooth®), light-based data transfer (e.g., infrared data transfer), an acoustic-based data transfer (e.g., sound wave-embedded data), or magnetic field-based transfer (e.g., reading the code from a magnetic stripe) may be used for inter-device communication.

In alternative example embodiments, a secondary user device may be the same device as the primary user device; for example, the device or components may be securely isolated. For example, a separation (e.g., a hardware separation, communicative separation, and/or electrical separation) between the devices helps ensure that the first device will not be able to obtain codes generated by the token/received, even if the first device were compromised. The separation may be physical, electrical, and/or communicative. To effect this separation, the electrical traces may be physically separated from components accessible by the first device by a certain distance to avoid the possibility of data generated by the second device circuitry being read by the first device. The distance may be determined as a function of the electrical signals used. That is, the distance between adjacent traces and components may be selected such that any electrical signals generated in the second device are not able to induce electrical signals in the first device such that the first device can process the induced signals to derive the one-time password. In some cases, the second device may be electromagnetically isolated from the first device by a sufficient air gap or an electromagnetic shield configured to block stray emissions. In one embodiment, active circuitry may be used to cancel out any radiated electromagnetic fields (e.g., by generating electromagnetic interference that generates sufficient noise to effectively obfuscate any electromagnetic fields generated by the second device). Alternatively, such active circuitry may be tuned to specifically cancel any waves transmitted by the second device. Additional electromagnetic interference shielding may be provided around the first device. Also, different types of media may be used to interconnect components of the first device and components of the second device. For example, electrical traces may be used for the second device, while short-range optical signals may be used for the first device. An optical signal may be generated by the second device that includes the one-time password and may be routed to a display of the second device via a waveguide. In addition, different communications protocols may be used for the second device as opposed to the first device (e.g., I2C vs. UNI/O® or 1-Wire®). In one embodiment, the first and second devices may be configured to periodically change their communication protocol or may be communicating on different communication channels.

Further example embodiments of FIG. 2 may include enabling a user to read the code (which may be sent to a second device 204, generated by the second device 204, and/or based on a seed value transmitted by a notification service 220) from a display of the second device 204. The code read from the display may be manually entered into a display of the primary device 202. In alternative example embodiments, the code could be transmitted by short-range communication; in addition to near field communication (NFC), other means for short-range inter-device communication may also be utilized in accordance with the systems and methods of the present disclosure. Such compatible technologies include, but are not limited to, induction wireless, infrared wireless (such as technologies operating according to specifications and protocols provided by the Infrared Data Association (IrDA)) or ultra-wideband formats. In some embodiments, first and second devices may utilize short-range, low-power and high frequency radio transmissions, such as Bluetooth®. In still other embodiments, the first and second devices may support acoustic-based data transfer. For example, the first device may include software components and a speaker that enable the first device to broadcast data to the second device as sound waves, while the second device may include software components and microphone that enable the second device to receive the data embedded in the sound waves. Thus, one or more of radio signal-based data transfer (e.g., NFC or Bluetooth®), light-based data transfer (e.g., infrared data transfer), an acoustic-based data transfer (e.g., sound wave-embedded data), or magnetic field-based transfer (e.g., reading the code from a magnetic stripe) may be used for inter-device communication.

The authentication service 210 may further be configured to provide a user with feedback information related to the authentication service process for determining an authentication device or mechanism, or the outcome of the determination. For example, the authentication service, after interacting with the recommendation engine, may provide information to the user that displays the device/mechanism proactively determined by the authentication service 210. Such feedback may be useful to help the user understand when/where the device/mechanism choices are stemming from and how the user may consider the choices of secondary devices in the future. In addition, the authentication service may proactively suggest a device to the user in the event that the user was selecting a device from multi-factor authentication process.

The user devices 202 and 204 may be any type of device that is configured to request that a code be issued for a user. Further, the user devices 202 and 204 may be configured to receive a system-generated code or submit the code for validation. For example, the user devices 202 and 204 may be any type of consumer electronics device including a laptop or desktop computer, a tablet, a mobile phone or a smartphone (e.g., mobile phone including an advance mobile operating system), a television or set-top box with an operating system and/or integrated Internet features, streaming or on-demand devices (e.g., a streaming media player), etc. The user devices 202 and 204 may be configured to communicate using any type of communication protocol. The user devices 202 and 204 may be equipped with a processor, such as a central processing unit (CPU) or a graphics-processing unit (GPU), which provides computing functionality to a user. The user devices 202 and 204 may also be equipped with one or more input peripherals, such as a touch screen that responds to a fingertip or a stylus input, a physical keyboard, a digital camera, a microphone, a touchpad or a mouse, among others. Furthermore, the user devices 202 and 204 may be configured with one or more applications that facilitate receiving voice inputs or voice commands from a user via the microphone or image inputs via a digital camera. In addition, the user devices 202 and 204 may also be equipped with one or more output peripherals such as a screen or speakers, whereby if the user devices 202 and 204 are equipped with a touch screen, the touch screen may serve as both an input and an output peripheral device. The user devices 202 and 204 may further be equipped with a global positioning system (GPS) circuitry that enables locating the devices. The user devices 202 and 204 may further be equipped with an operating system and may be configured to execute software applications and programs compatible with the operating systems.

Figure 3:
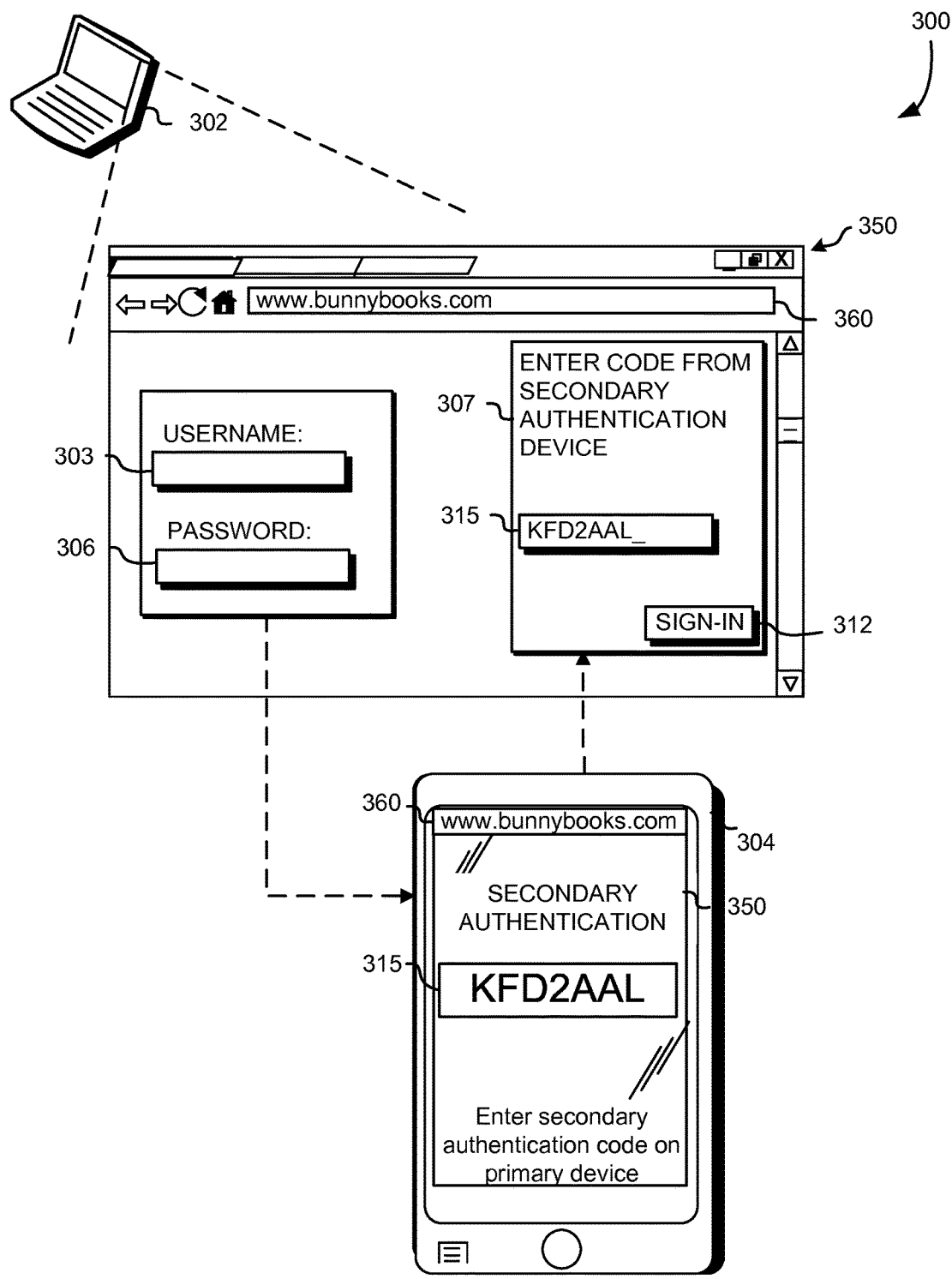
FIG. 3 shows an illustrative example of a user interface of a website and a user interface of a mobile device for multi-factor authentication in accordance with at least one embodiment.

FIG. 3 shows an illustrative example of a diagram 300 showing a user interface of a website and a user interface of a mobile device for multi-factor authentication in accordance with various embodiments. In the illustrated embodiment, the diagram 300 shows two graphical user interfaces for a web application and for a mobile device. The first graphical user interface is a web client running on a personal computer 302 and the second graphical user interface is depicted on the smartphone device 304.

The first and second graphical user interfaces may be generated by an application that, in this example, are interfaces of browser applications 350, although other types of applications may provide a graphical user interface. The browser applications 350 may be executed on a computing device such as the personal computer 302 or the mobile phone 304, or other devices, such as a notebook computer, tablet computer. Executable code for generating the graphical user interfaces may be an application code stored locally on a device executing the application or, as typical with browser applications, the code may be generated remotely and transmitted to the device executing the application to be executed with the code of the browser application. It should be noted, however, that various aspects of the present disclosure are applicable to other types of interfaces and are not limited to those provided through browser applications. For example, techniques of the present disclosure may be utilized in connection with mobile applications on a mobile device that utilizes network communications.

In the illustrative example of FIG. 1, the browser applications display the same web page 360 (e.g., www.bunnybooks.com) provided by a service provider, such as the computing resource service provider 250 as depicted and described in FIG. 2. The service provider may, for example, operate a collection of computing devices, including one or more web servers, to provide the web pages 360 to various users on various devices. The service provider may transmit the web pages 360 in the form of one or more hypertext markup language (HTML) documents or other documents or collection of documents that are processed by the browser applications 350 to display the web pages on a display device of a computer system on which the browser application is executed; in the instant embodiment, the display devices include the computer 302 and the mobile phone 304.

An authentication credential, in an embodiment, is a collection of information sufficient and/or necessary for access to one or more service provider systems. The information, for example, may comprise credentials usable for access to a network resource of the service provider system. In one example, an authentication credential may include a username and a password where the username and password are sufficient for access to the service provider system. In this example, the username and password may be primary credentials of a user using multi-factor authentication. It should be noted that a single authentication object may be usable for authentication with multiple different systems that may be managed and operated by different entities. In some examples, credentials may include long-term alphanumeric credentials corresponding to an identity. Long-term alphanumeric credentials may comprise, for example, one or more of a username, password, electronic mail address, PIN, telephone number, physical mailing address, network address, or other identifier or collection of identifiers that collectively uniquely map to an account of a system. Credentials may further include e-mail addresses, phone numbers, or other types of login credentials.

In some example embodiments, a password may not be necessary. When the authentication factor is a mechanism or device that the user possesses, the device itself may provide authentication without a need for a password. For example, if the user is wearing a bracelet or key-fob on which the user is already authenticated with the service, once the user is in proximity with a device, such as a laptop communicating with the bracelet, the device recognizes a user device associated with a user by way of authenticating the device. If the user opens a webpage on the laptop for a website that normally requires a login and password or possibly second factor authentication, the user may be authenticated with the website without additional input. This is because the authentication service, in this example, is configured to proactively determine that the user's bracelet is an authenticated device, and its proximity and connection to the laptop satisfy the required authentication requirements for that website.

In this example illustrated in FIG. 3, the interface of the web client is configured to enable the input of primary credentials and secondary credentials 315, which will be provided to the user via a secondary authentication device. In this example, the interface includes a username field 303 and a password field 306, which, in this example, are graphical user interface elements that enable a user to enter (e.g., via a virtual or physical keyboard) alphanumeric input corresponding to respectively a username and password. As with all embodiments described herein, variations that utilize different credentials or additional credentials are also considered as being within the scope of the present disclosure.

Once a user has enabled multi-factor authentication for a particular user account, a user may be required to provide the set of primary credentials (e.g., username and password), as well as the multi-factor authentication code to access the user account or a network resource that is logged into via the user account. For instance, a user may access an authentication service, which may be associated with a computing resource service provider hosting the user account, to access the account. In an embodiment, the authentication service initially only enables the user to provide a set of credentials for verification. If the authentication service determines that the user's set of credentials are valid, the authentication service may prompt the user for his/her multi-factor authentication code and provide the multi-factor authentication code to a secondary device. If the multi-factor authentication code is authentic, the user may be granted access to the managed directory.

The authentication service may have a secondary user device registered with the user account in order for the user to receive an authentication code on a secondary device for use with the multi-factor authentication system. The secondary device, illustrated here as the mobile phone 304, receives the authentication code, in a secondary authentication field 315, from the authentication service. A user in possession of his/her secondary device may enter the received authentication code in the authentication code field 315 via the secondary authentication device graphical user interface 307. Once the user has successfully entered the multi-factor authentication code, the user may access the user's account or request network resource by completing the sign-in 312 process.

In example embodiments, in place of the authentication code transmitting a secondary one-time password, the authentication service may transmit a notification request to a device, where the user may allow or deny the request in order to be authenticated. In such an example, the response to the request, e.g., the approval or denial of the notification request, may be a response message or callback to the authentication service. In response to an approval, the user may access the user's account without additional login requirements. The notification request (and response thereto) may be used to confirm possession of the authenticating device via the notification mechanism. The authentication service may further transmit the notification request (or other authentication mechanism) to the same device as the initial user request; however, the secondary interaction may be transmitted via a separate or distinct delivery channel. For example, a second SIM card could be used, or an SMS message in addition to an approval notification via an application.

In another example embodiment, the authentication service may ping an application on mobile device to determine a location, or an application of a mobile device may report its location. In one example, primary device (e.g., laptop) may be able to ping secondary device(s) via short-range communication and primary device(s) may report details about secondary devices (e.g., whether mobile phone No. 1 and/or e-reader No. 2 is nearby). In other examples, some information may not come from device at all. For example, a log of the last communication from a device can be retrieved and analyzed and, if it is relatively recent (e.g., within last 3 minutes or other predetermined time measurement), assume that the device is nearby. The authentication service may further be configured to determine a state of a set of devices, e.g., the location of the primary device, the location of the secondary device, the connectivity of either device, etc., where the set of devices may have just one device (e.g., the primary device or the secondary device). Further example embodiments may include information or user credentials being dependent upon information communicated from one or more devices and/or the credentials being dependent on the communicated information because the credential is derived based at least in part on the communicated information.

In alternative example embodiments, an authentication service, front-end web service, or components thereof may determine relative locations of the user's primary device and a user's secondary devices. For example, if the user's primary device is a work computer detected at an office and the second device is a mobile device detected at a home location, then the secondary device would not be the appropriate secondary device to which to transmit a code.

Techniques described and suggested herein allow for increased data security while achieving a better user experience. In some embodiments, a graphical user interface allows for easy use of access credentials to gain access for which providing valid credentials is a prerequisite. For example, a user may utilize the graphical user interface to login to a website to gain access to information and/or services of the website, although the techniques of the present disclosure are applicable in other contexts where credentials may be required for access (such as for access to functionality of a user interface usable to control home automation features).

Figure 4:
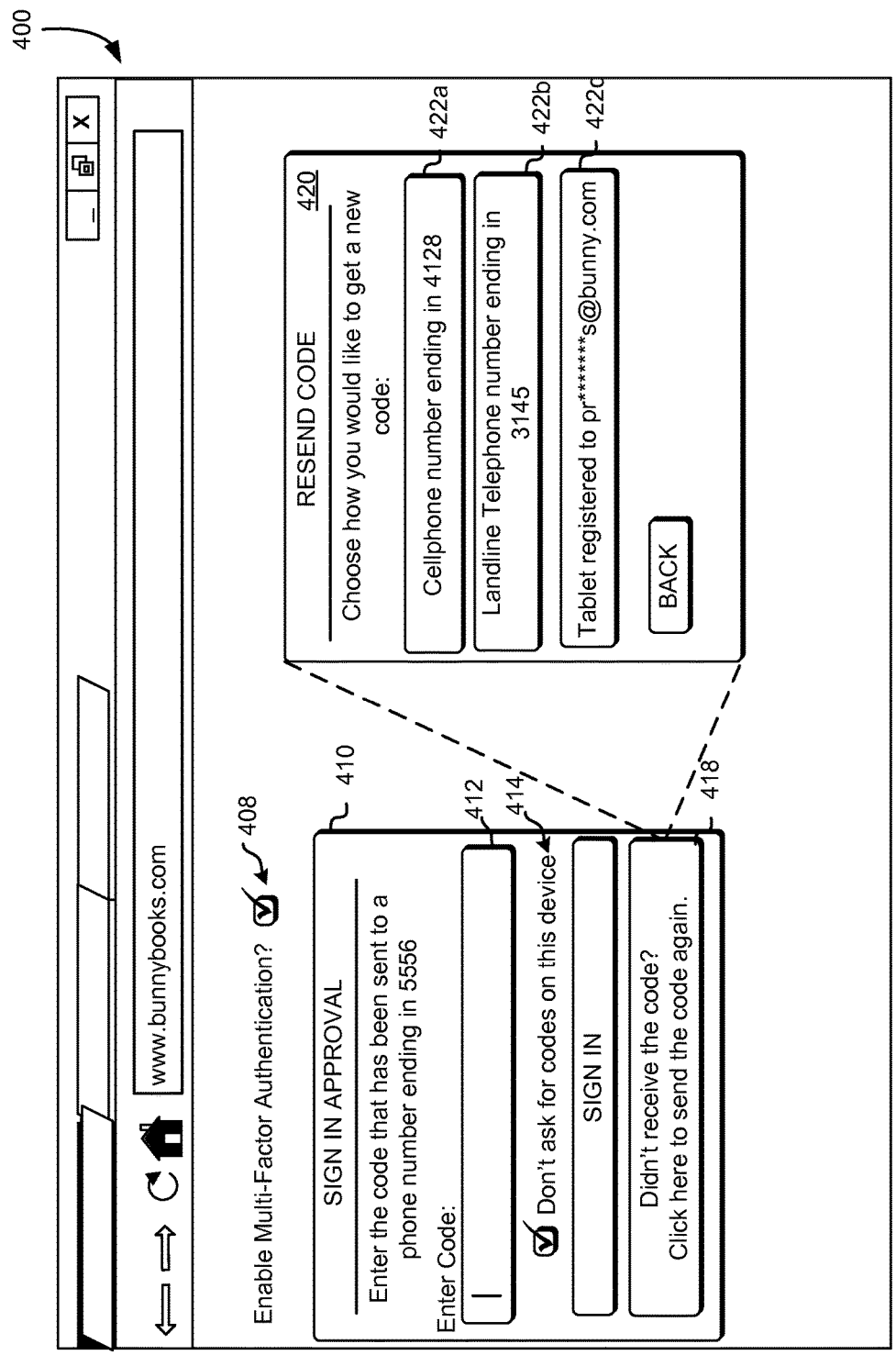
FIG. 4 is an illustrative example of a webpage sign-in process and of a webpage providing multi-factor authentication options in accordance with at least one embodiment.

FIG. 4 is an illustrative example of a diagram 400 showing a webpage sign-in process and of a webpage providing multi-factor authentication options in accordance with example embodiments.

In particular, FIG. 4 shows two web pages with respective user interfaces, 450a and 450b, which may be displayed on a display device, for example, a computer monitor of a notebook or personal computer, a display of a mobile device, a display of a tablet computing device or otherwise a display of a computing device. The user interface 450a is provided by an operating system of a computing device causing the user interface 450a to be displayed. In the particular example illustrated in FIG. 4, a display of a browser application 460a is displayed on the user interface 450a. The browser application may be, for example, as described above.

On user interface 450a, the browser application provides a sign-in approval screen 410. The sign-in approval screen 410 may be presented, for example, to enable a user to provide secondary credentials, such as a multi-factor authentication code (having already entered primary credentials, such as a username and password as shown in FIG. 3), in order to gain access to one or more services of a service provider. The user interface provides a code field 408 to designate whether multi-factor authentication has been enable for the user's account and a code field 412 for the user to enter the authentication code. The interface 450a further provides a trusted device field 414, which enables a user to demarcate the device being used as a trusted device, which enables the user to bypass future multi-factor authentication requirements. Further, the interface 450a provides a code regeneration button 418, which may be utilized by the user to resend a secondary authentication credential, such as a multi-factor authentication code, to a different user device or to receive the code again.

In the example embodiment of FIG. 4, if a user requires or desires a code to be resent, the user may use the code regeneration button 418, in response to which the user interface 450b will be provided to the user. The user interface 450b includes a resend code screen 420, which provides a list of registered or known secondary devices to which the multi-factor authentication code may be transmitted, where the screen 420 could be a call-out box, iFrame, or the like. For example, the user could select one of the three listed devices to be the device to which the authentication code is resent; the user could have the code sent to the cellphone 422a, the landline 422b, or the tablet 422c. Once the resent code is received, the user may press the back button on the user interface 450b and type in the received code into the code field 412.

In an embodiment, an authentication code 412 includes one or more short-term credentials. A short-term credential may be a credential that, due to a limited lifetime, is required to be presented to an authentication service within a limited amount of time before generation of the authentication code. Example short-term credentials include a one-time password (OTP) code obtained from an OTP token such as described above. Example OTP tokens include token devices produced by the EMC Corporation (e.g., RSA SecurID tokens) and tokens produced by Gemalto NV. OTP tokens may also be integrated into a device that provides authentication objects, such as a user computing device, and information may be obtained therefrom accordingly. Another example of a short-term credential is a cryptographically verifiable time stamp from a time server. Generally, a short-term credential may be any credential valid for an amount of time determined as short and, as a result, the use of short-term credentials adds an additional layer of security in that the amount of time a compromised short-term credential is valid is limited, thereby preventing security breaches and/or the effects of security breaches.

In alternative example embodiments, the initial login authentication may not be directly followed by the secondary authentication mechanism, but may be provided at a later stage. For example, as a user progresses through webpages to one or more secure webpages, such as a payment page, the secondary authentication may be required after additional operations have been performed since the initial login. In some example embodiments, the secondary mechanism could be approved or provided through another authorized user.

Figure 5:
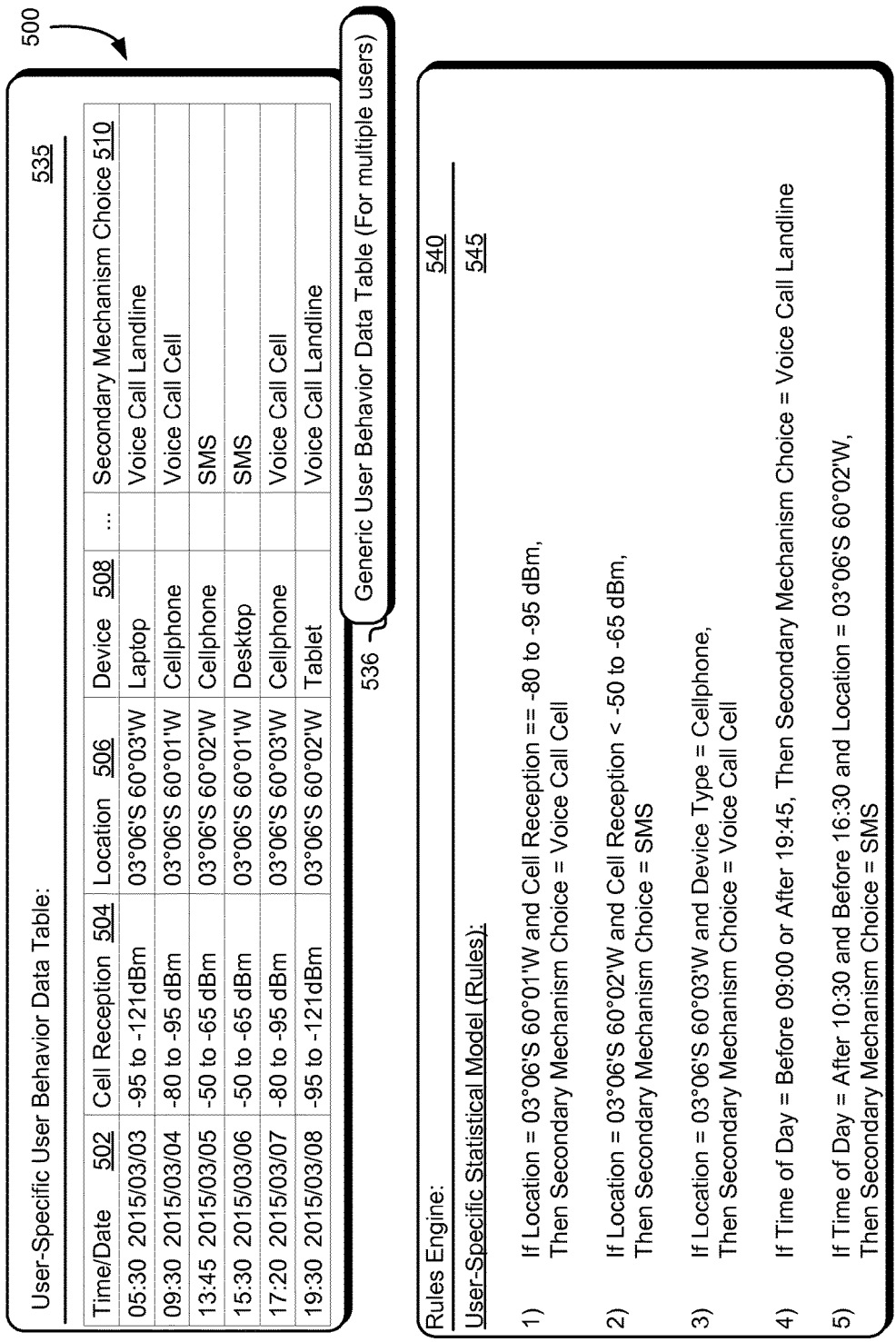
FIG. 5 is an illustrative example of a user behavioral data table and statistical model rules in accordance with at least one embodiment.

FIG. 5 is an illustrative example of a machine-learning interface 500 that may be used to show a user behavioral data table and statistical model rules.

If a user has activated or enabled multi-factor authentication (MFA) for an account hosted by a computing resource service provider, the provider, via a computing device, may capture user behavior associated with the account. For example, a service provider, such as the computing resource service provider 250 as described and depicted in FIG. 2, may store, in a user behavior database, user behavior data from a user's interaction with web services via a user device.

User behavior may include, for example, a user location based on a wireless fidelity (WiFi) signal or a Global Positioning System (GPS) location, if the device is being charged, a device fingerprint, a timestamp associated with user communications, time and day information, an Internet protocol (IP) address, types of searches or purchases made from a device using the user's primary credentials, user login attempts, information retrieved from user device sensors, ambient environment data, biometric data, and other contextual data that may be used to associate the user and the device. Such user behavior may be captured at a time when a user logs into an account via any device of the users that is registered or corresponds with the user account.

In some example embodiments, a user behavior database or similar component may further be configured to capture relationship data, such as data related to a dependent variable and one or more independent variables. For example, relationship data may include factors gathered from external sources, such as a cellular phone carrier coverage map, including retrieving or obtaining an ordered set of GPS coordinates that defines coverage regions and determining if a user device's current location is within one of the coverage regions based on the GPS coordinates. Further relationship data may include obtained source data from other customer devices in a physical vicinity of the user (such as user devices located at the same GPS location or using the same cellular tower), or other cross-customer behaviors that may serve to improve information corresponding to the user's behavior with respect to different user devices.

The example embodiment in FIG. 5 further illustrates a user-specific user behavior data table 535 showing four types of user behavior (e.g., 502, 504, 506, and 508) that may be used, alone or in combination, as factors or input criteria in a statistical model or machine-learning algorithm to determine a correct or preferable label or secondary user device and/or mechanism (e.g., 510). The data table includes input data related to time and date information 502, cellular service reception 504, location information 506, device type 508, the ellipses are to indicate that the data table may include any suitable number of behavior information or device information as necessary or desired. The data table 535 further includes a machine-learning label, e.g., the desired secondary mechanism choice 510 for the user.

The time data records a series of times that correspond to the other factors and behaviors stored in the table. For example, in one embodiment, on Mar. 3, 2015 at 05:30, the user's device may have a signal strength in a range of −95 to −121 decibel-milliwatts (dBm) identifying very poor signal strength, a location of the device is identified based on GPS location information as 03°06'S 60°03'W, the device type is the user's laptop, and the secondary authentication mechanism chosen by the user at that time is a voice call to a landline telephone number. The user may have entered their preference for their secondary authentication mechanism in response to failing to receive the authentication code after successfully entering their primary user credentials or failing to receive access in response to an authentication approval transmitted.

In another example, on Mar. 8, 2015 at 19:30, the user's device is received very poor signal strength (in the range of −95 to −121 dBm), the location is indicated as 03°06'S 60°03'W, the user's device type is a tablet computer, and the user's secondary mechanism choice is a voice call on a landline (which is the secondary device type). Such user behavior data may be updated with the user database in real-time, near real-time, nightly, weekly, etc.

In example embodiments, the data stored in the user-specific user behavior data table 535 may be used as criteria or input for a machine learning algorithm or statistical model, which are analyzed according to a set of rules (described in detail below) in order to detect a context or pattern related to a user's MFA device or mechanism preferences. The detected pattern may be utilized and analyzed to automatically determine a user's preferred device and/or mechanism to be used for multi-factor authentication under similar contexts. In other words, the stored user behavior data may be analyzed according to a system and the outcome of the analysis may be proactively applied as a user's preference, without the user actually entering or requesting their preference.

In some example embodiments, the user behavior database (e.g., the user behavior table 535), is operably interconnected with a rules engine 540, in a manner that enables communication between the two components. The rules engine 540 may be any computing device or server of the computing resource service provider or component thereof. The rules engine may be configured to determine what statistical model, machine-learning algorithm, or the like may be used to interpret and/or analyze the user behavior data. The rules engine may further be configured to determine what factors, user behaviors, and/or external sources to use as input for the analysis, how to select an order or priority of the factors when more than one factor is being used, and what algorithms or models to use to perform the analysis. Machine-learning may include clustering algorithms, combining multiple learning algorithms, dimensionality reduction algorithms, regression analysis, and the like.

The data gathered from the specific customer, general customers, and external sources and/or the data stored in the user behavior table may be used as inputs in a machine learning algorithm or concept in order to best model or determine a specific mechanism or device, referred to in machine learning as a label, by which the user can authenticate their device and/or access. Different machine learning concepts may be applied to the user behavior data in order to determine a best mechanism or device type to proactively provide the user with the authentication information necessary. For example, when behavior data is being used on a user-specific statistical model (e.g., a user-specific user behavior data table 535, which includes data associated with that specific user), the machine learning concepts to be implemented may be a regression model, a simple linear logistic model, or a logistic regression model, which may model the likelihood of a customer choosing any of the possible mechanisms, endpoints, or devices that the customer has registered with the service provider.

In example embodiments, more complex machine learning concepts, such as Naive Bayes classifiers, neural networks, random forests, or ensemble learning methods may be used when applying multiple users' behavior data (e.g., a generic user behavior data table 536, which includes data associated with multiple users) and/or external data (e.g., cellular service provider service maps) to the rules engine 540. For example, when large amounts of user behavior data exists, such as multiple inputs from multiple customers, neural networks or more robust machine learning algorithms may be employed in order to train or teach the statistical model 545 based on a larger amount of user/customer behaviors.

For example, in the embodiment of FIG. 5, the rules engine may be operably interconnected to a statistical model 545, which is a user-specific statistical model. The rules, rules 1-5, provide the priority and method of analyzing the data in the user behavior data table 535. For example, rule 1 is: If Location=03°06'S 60°01'W and Cell Reception=−80 to −95 dBm, then Secondary Mechanism Choice=Voice Call Cell; meaning, if the location of the user is at 03°06'S 60°01'W, and the cellular reception is between −80 dBm and −95 dBm, then the multi-factor authentication code or multi-factor authentication mechanism should be sent to the user's landline using a voice call.

Rule 2 is: If Location=03°06'S 60°02'W and Cell Reception <−50 to −65 dBm, then Secondary Mechanism Choice=SMS; meaning, if the first rule is not true, than rule 2 should be analyzed. Rule 3 is: If Location=03°06'S 60°03'W and Device Type=Cellphone, then Secondary Mechanism Choice=Voice Call Cell; meaning if both rules 1 and 2 are not true, than rule 3 should be analyzed. Rule 4 is: If Time of Day=Before 09:00 or After 17:45 then Secondary Mechanism Choice=Voice Call Landline; meaning that if rules 1, 2, and 3 are not true, than rule 4 should be analyzed. And rule 5 is: If Time of Day=After 10:30 and Before 16:30 and Location=03°06'S 60°02'W, then Secondary Mechanism Choice=SMS; meaning that if all of rules 1-4 are not true, than rule 5 should be analyzed. If no rules are true according to this example embodiment of this statistical model, then the rules engine should choose a different model or machine-learning algorithm to use.

In alternative example embodiments, if one of the rules is found to be true, a real-time data check may be performed, for example using external information, to determine if the rule should be ignored or overridden. For example, when a model is updated in real-time or near real-time, the model may include a post-production heuristics module to retrieve rules and outcomes and be compared to additional external sources of information (e.g., a cellular service provider's hourly service outage map) to determine if the rule should be ignored based on real-time or near-real time information.

For example, a model may be updated in real-time when events or data are received simultaneously or data is received at the same time that the model is being processed according to the rules engine (e.g., new data arrives at the same time existing data is being processed). In example embodiments, real-time may include updates that are received instantaneously and bounded and/or limited by a time frame (e.g., the time frame in which a recommendation system or rules engine may process the data) or bounded/limited by available resources (e.g., resources available for computing the recommendations).

In alternative example embodiments, data may be updated or the model may be updated in real-time, where the data may be processed immediately or the model may be updated immediately (e.g., as it happens). For example, in the context of a system that processes data, real-time or near real-time may include processing the data as it is received (versus storing/persisting the data as it is received and processing that data later on), processing non-buffered data, or non-cached data. Further examples may include transforming the data and/or model without intentional delay, given the processing limitations of the system and a time required to accurately receive the data or processing the data fast enough to keep up with an input data stream. Further example embodiments may include data, statistical models, rules engines, and other components being updated in near real-time; for example, this may include the data being updated substantially immediately, where substantially includes a measurement of completion (e.g., how much data is updated, how much time is needed to process or update the data compared to real-time processing) and/or substantially may include a measurement of improvement (e.g., how much did the data or update improve the existing data after the update occurred).

In the example embodiment, the rules engine using the user-specific statistical model given the user behavior data as inputs, determines the correct or preferred secondary MFA mechanism and/or device to provide the user with the MFA code or method of authentication. Based on the application of the model to the specific context, a notification service, such as the notification service 220 described and depicted in connection with FIG. 2, may automatically transmit the MFA code or another form of authentication approval to the determined user device. The notification may be transmitted directly in response to a successful user login with the primary user credentials (e.g., with an authenticated username and password), without the user having to select a device to resend the MFA code to, as depicted in FIG. 4. In further example embodiments, no initial login may be required before receiving an MFA one-time password (OTP) or other authentication mechanism; for example, a user request may trigger the need for single-factor authentication that is secure and robust.

In alternative example embodiments, the machine-learning algorithms may further be employed to determine possible account security problems based on the user behavior data table. For example, when a user of an electronic commerce website, logged in to their account, attempts to change a delivery address or add a new payment option associated with the user's account, such action could trigger a need for progressive assurances. In other words, a user behavior that is out of character for that user or generally determined to be a rare behavior (such as changing delivery addresses) may cause the user to reconfirm or authenticate them self with the website.

In some example embodiments, the user behavior data and/or the statistical model outcome may be used, at least in part, to create a user profile. The user's profile may be generated based on frequent check-ins or similar patterns of behavior such that the authentication service may predict an authentication mechanism for the user based on the user profile.

FIG. 6 is an illustrative example of a process 600 that may be used to interpret a statistical model based on user behavior data in accordance with at least one embodiment. The process 600 may be accomplished by a computing server, such as the rules engine 240 as described and depicted in connection with FIG. 2 or a suitable component thereof.

Returning to FIG. 6, the process 600 may include the rules engine receiving data from a customer's primary device (602); the data may include, for example, physical location, device fingerprint, a timestamp, a date and time, an Internet protocol address, etc. The rules engine may compare the received data to an entry for a customer in a user's contextual database, such as user behavior data stored in a user-specific database (604), such as the user behavior database 235 described and depicted in connection with FIG. 2. The user contextual database may include past user behavior recorded in response to user login attempt and other contextual data related to the user, the user's account with the computing resource service provider, the user's known devices, user preferences corresponding to the user's account, and the like.

The process 600 may further include the rules engine initializing a customer-specific statistical model, such as the statistical model database 245 described in connection with FIG. 2. Returning to FIG. 6, the process 600 may further include the rules engine utilizing the customer-specific statistical model to determine a best secondary mechanism and/or secondary device by which to send an authentication code to the user via the type of user device the user generally selects based on a certain context (606). In some example embodiments, the statistical model may include using machine-learning algorithms to determine the secondary user device, such as explained in detail in connection with FIG. 5. The statistical model may be populated with certain factors as input criteria and used alone or in combination with a machine learning algorithm to determine an ideal, correct, or convenient multi-factor authentication mechanism and/or device to use for providing the user with an authentication code.

Returning to FIG. 6, the process 600 may further include the rules engine interpreting the statistical model based on the current context of the user (608). For example, if a user's primary user device receive poor signal reception at the user's home, the statistical model may identify that when an attempt to log into the user's account from an Internet protocol (IP) address associated with the user's home, the user always selects a secondary mechanism of "voice call" using a secondary user device as the user's home phone line, as an alternative method for receiving an authentication code. In some example embodiments, the statistical model may be a user-specific statistical model or a generic statistical model that encompasses some or all customers that are in a vicinity of the user, or have another property that relates them to the user such that the behavior of those other customers may be useful.

Based on this context, the statistical model may be utilized to identify this pattern and proactively transmit an authentication code to the user's secondary device without the user needing to select a secondary mechanism in order to receive the code in a method that is most convenient for the user. The outcome of the statistical model is applied to the context of the user behavior data provided by the primary user device and the rules engine provides the outcome, e.g., the decision on which secondary mechanism and/or device should be used (610).

Figure 7A:
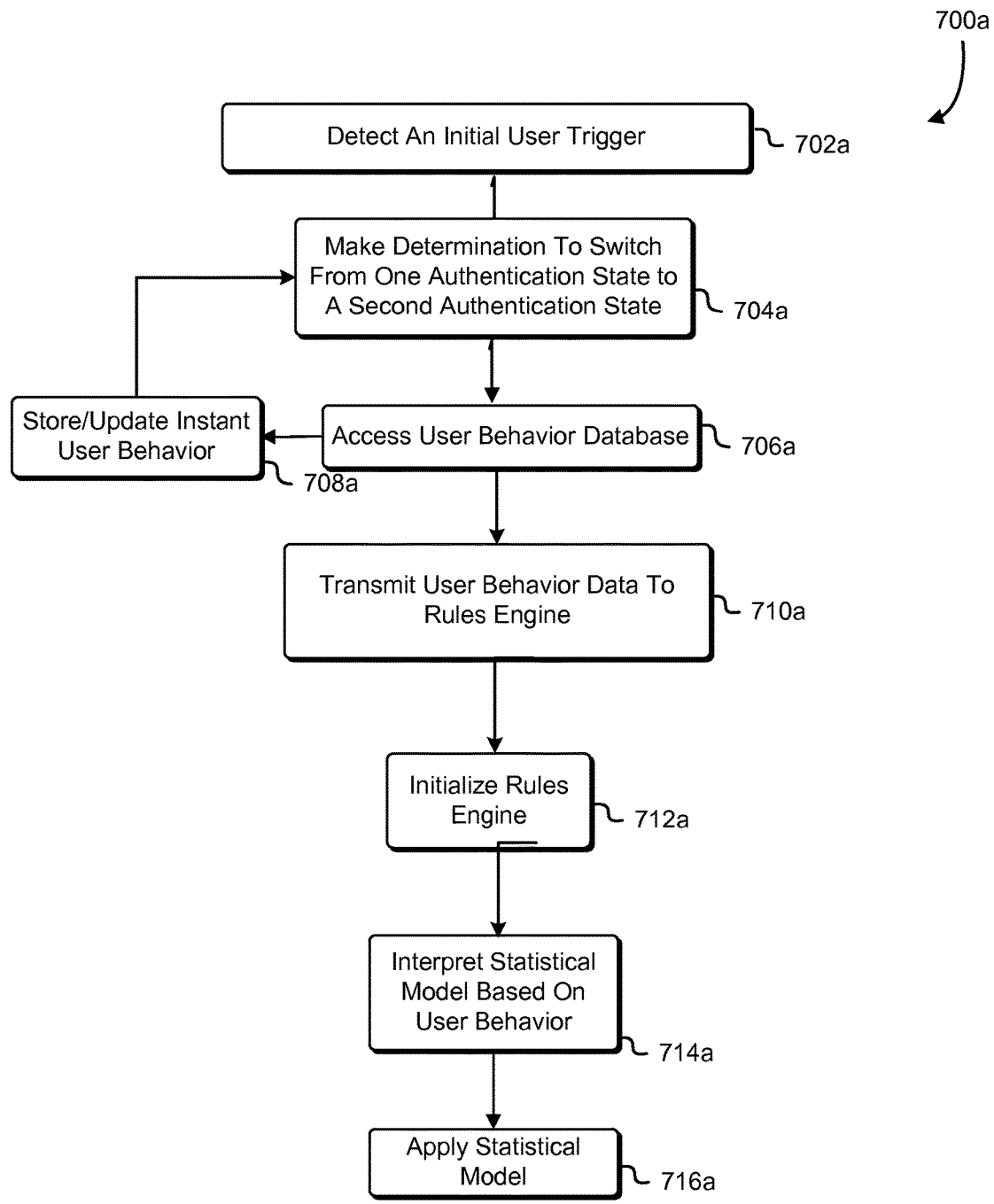
FIG. 7A is an illustrative example of a process for proactively determining an authentication method based on a user request in accordance with at least one embodiment.

FIG. 7A is an illustrative example of a process 700a for proactively determining an authentication method based on a user request in accordance with at least one embodiment. The process 700a may be accomplished by a computing server, such as an authentication server 110 described and depicted in connection with FIG. 1 or suitable components thereof.

Detect an initial trigger, such as a user request (702a) and make a determination to change from one authentication state to at least a second authentication state (704a). For example, the first authentication state may have been determined as a secondary authentication code; however, if the initial trigger causes the authentication service, via a rules engine or the like, to determine that the user is not in proximity to the authentication device, a second authentication state may be selected instead. In the example process 700a, multiple modes or states of authentication may be available depending on what actions the user is performing at the specific moment. For example, if a user is entering a login credential and also wearing a proximity authentication device, the authentication service may change authentication states to a better choice of authentication.

The authentication service accesses a user behavior database (706a) and stores and/or updates the instant user behavior information (708a) in the same or different user behavior database, wherein the user behavior data may include contextual data related to the user's authentication practices over a period of time. The updated user behavior data may be returned to the authentication service to be used, at least in part, in making a next authentication state determination. The authentication service may transmit user behavior data from the user behavior database to a rules engine (710a), which may be initialized (712a) by the authentication service or component thereof, to use a statistical model and interpret the statistical model based on the provided user behavior (714a). The rules engine may then apply the statistical model to the current user behavior data in order to identify an ideal secondary user device to provide the multi-factor authentication code to (716a).

Figure 7B:
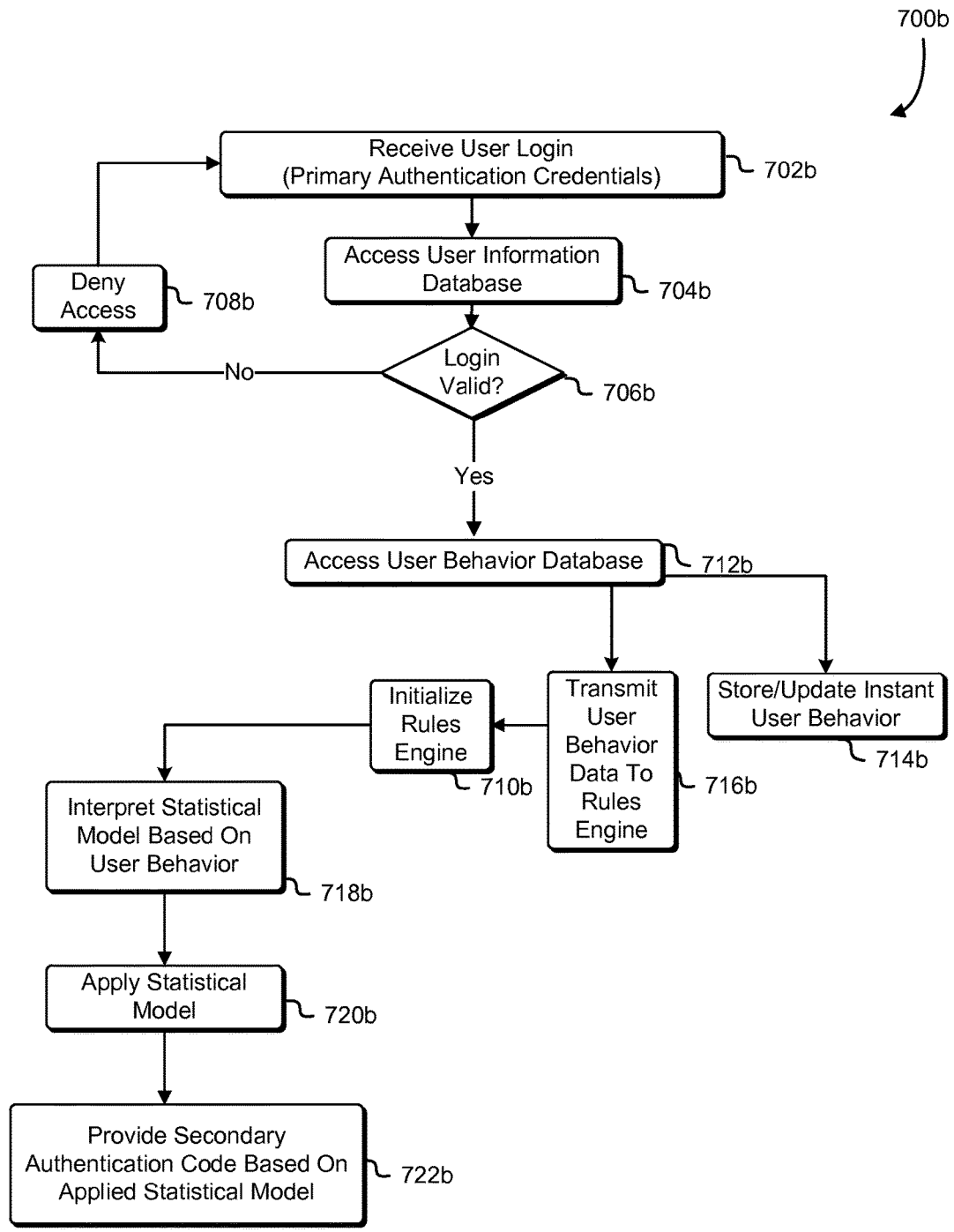
FIG. 7B is an illustrative example of a process for providing secondary authentication credentials to a secondary user device in accordance with at least one embodiment.

FIG. 7B is an illustrative example of a process 700b that may be used to perform multi-factor authentication in accordance with at least one embodiment. The process 700b may be accomplished by a computing server, such as an authentication server 110 described and depicted in connection with FIG. 1 or suitable components thereof.

Returning to FIG. 7B, the process 700b may include the authentication server receiving user login credentials (702b) from a user of a computing resource service provider via a user device. The user's login credentials may include receiving a primary authentication credential, such as a username and password. However, other forms of credentials may include biometric credentials, such as instances of information encoding one or more fingerprints, one or more retinal scans, a human voice, an image of a face, typing cadence, and others. Biometric credentials generally may comprise information suitable for use in a biometric authentication system. The information may, for example, be an optical and/or capacitance scan of one or more fingerprints or information obtained by processing a scan of one or more fingerprints.

The process 700b may include the authentication server accessing a user information database (704b), such as the user information database 225 as described and depicted in connection with FIG. 2. The user information database may include data related to a user's account credentials such that the authentication server may validate the user login credentials (706b). If the user login credentials are invalid, the authentication server will deny access (708b) and provide the user with another opportunity to enter credentials. In some embodiments, if the authentication server has denied access multiple times, an authentication object may be used to distinguish human users (human operators) from automated agents (often referred to as bots). For example, an authentication object may encode a solution to a test (puzzle) configured to be easier for human users to solve than for automated agents. The test may be, for example, a completely automated public Turing test to tell computers and humans apart (CAPTCHA). In some embodiments, a user is able to interact with a user interface to input a solution to a test and perform a drag and drop operation of a proposed solution to the test to submit the proposed solution.

If the authentication server determines that the login credentials were valid, the authentication service accesses a user behavior database (712b) and stores and/or updates the instant user behavior information (714b) in the same or different user behavior database, wherein the user behavior data may include contextual data related to the user's authentication practices over a period of time. The authentication service may transmit user behavior data from the user behavior database to a rules engine (716b), initialized by the authentication service or component thereof, to use a statistical model and interpret the statistical model based on the provided user behavior (718b). The rules engine may then apply the statistical model to the current user behavior data in order to identify an ideal secondary user device to provide the multi-factor authentication code to (720b). Once an ideal secondary user device is determined, the authentication server, or a component interconnected thereto, may transmit the secondary authentication code to the determined secondary user device (722b).

FIG. 8A is a swim diagram illustrating a process 800a that shows the interactions between a customer device and an authentication service in accordance with at least one embodiment.

In example embodiments, the process 800a may include additional or fewer operations in accordance with embodiments presented herein. For example, the authentication service may determine a secondary factor for a customer asynchronously, e.g., as a user begins browsing a website or adding items to a shopping cart prior to logging in with the user's credentials, the authentication service may begin determining the secondary device or mechanism for the user. Further, the authentication service or component thereof may transmit the secondary authentication code to the user's secondary device at the same time as the user's log in credentials are authenticated, such that the secondary code is available on the user's device as soon as the user requires it.

Returning to FIG. 8B, at step 806a, the authentication service initializes use of a statistical model, where the statistical model is specific for the customer. At step 808a, the authentication service further provides user behavior data to the statistical model, which, at step 810a, is interpreted in light of the user behavior data. At step 812a, the authentication service may proactively determine a mechanism to enable the user to authenticate the user's identity and/or device and transmit, at step 814a, the authentication mechanism determined to the customer device. The customer device, having received the authentication mechanism from the authentication service, may respond to the authentication mechanism; for example, according to any of the methods for responding as presented herein.

Figure 8B:
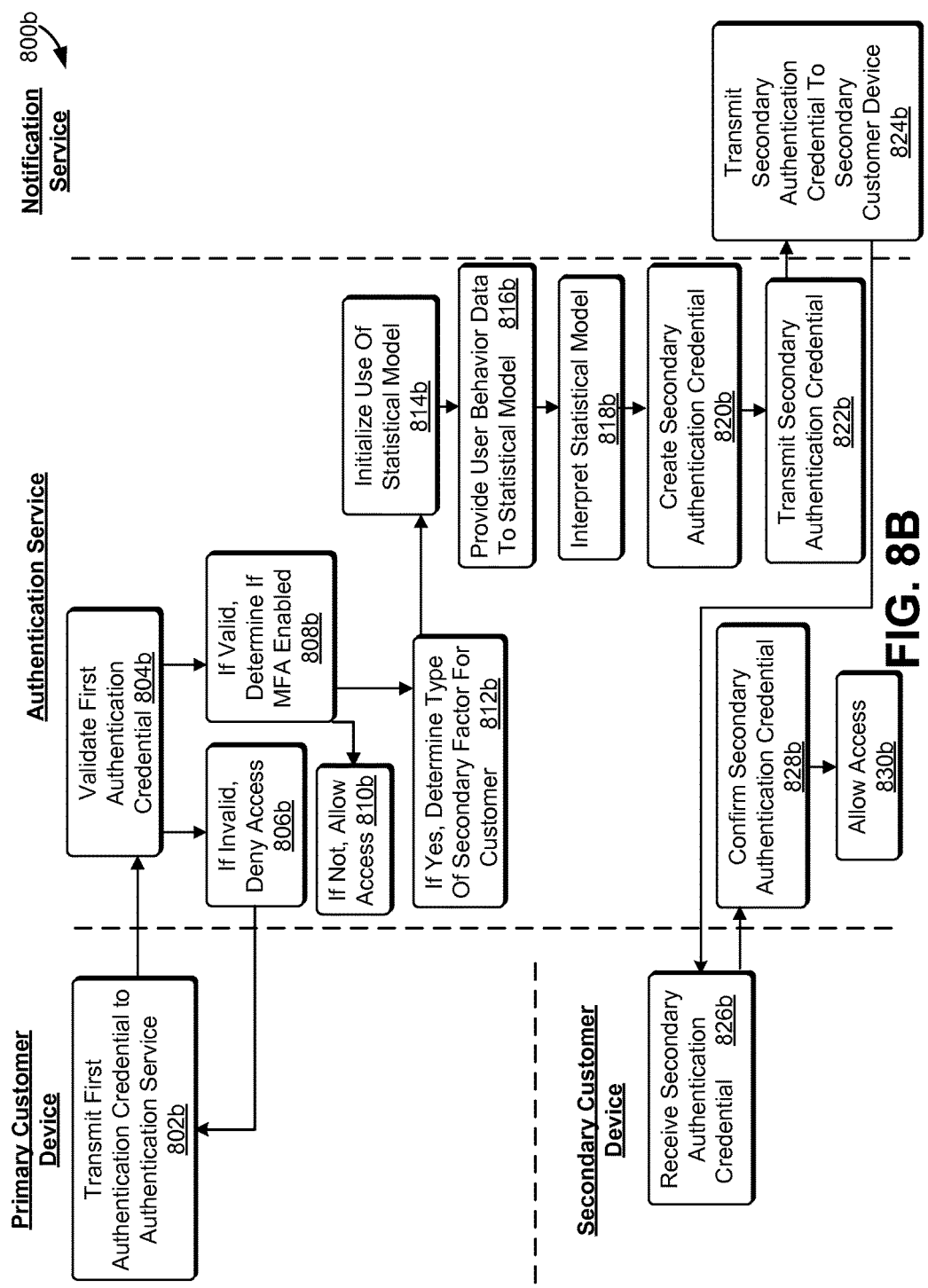
FIG. 8B is a swim diagram illustrating the interactions between a primary customer device, an authentication service, a notification service, and a secondary customer device in accordance with at least one embodiment.

FIG. 8B is a swim diagram illustrating a process 800b for identifying secondary mechanisms for a user for use in multi-factor authentication in accordance with some embodiments. The process 800b may be performed, for example, by various components of the computing resource service provider and a customer of the resource provider as described and illustrated in connection with FIGS. 1 and 2. For example, the process 800b may be performed by a primary user device, such as user device 202, an authentication service, such as the authentication service 210, a notification service, such as the notification service 220, and a secondary user device, such as the user device 204, all depicted and described in connection with FIG. 2 or any suitable components thereof.

Returning to FIG. 8B, the process 800b includes at a step 802b, a primary user device transmitting a first authentication credential from the primary customer device to the authentication service. The first authentication credential may include a username, an electronic mail address, PIN, telephone number, and password, or other identifier or collection of identifiers that collectively uniquely map to a user's account.

In step 804b, the authentication service validates the first authentication credential provided by the user via the primary customer device. The authentication service may retrieve authentication details from a user information database, such as user information database 225 as described and depicted in connection with FIG. 2. The user information database may contain user login credentials, user account information related to types of secondary mechanisms and/or factors for use in multi-factor authentication, the status of multi-factor authentication for the user account, and other user information. At step 806b, if the authentication service determines that the first authentication credential is invalid, the authentication service is configured to deny access to one or more network resources. In response to the determination of denial of access, the authentication service is configured to return a denial notification to the primary customer device; in the alternative, the authentication service may provide the denial information to a notification service that may provide a message response to the customer.

At step 808b, if the authentication service determines that the first authentication credential is valid, the authentication service is configured to determine if multi-factor authentication is enabled for the user account being accessed by the primary customer device. As described above, the authentication service may retrieve the status of multi-factor authentication for the customer account from a user information database operably interconnected to the authentication service. At step 810b, if the authentication service determines that multi-factor authentication is not enabled, the service is configured to allow access to one or more network services without further authentication requirements. The authentication may further determine if multi-factor authentication is not required based on the primary customer device being stored as a trusted user device, thereby allowing the user to utilize single-factor authentication or other authorization methods for gaining access to network resources of the computing resource service provider.

At step 812b, if the authentication service determines that multi-factor authentication is enabled for the user account, the authentication service further determines the type or types of secondary factors for the customer. Secondary factors may include user device sensors, ambient environment, GPS location, battery status of device, external sources (e.g., AT&T coverage map of service), network connectivity of device, and the like as described in combination with FIG. 5. Returning to FIG. 8B, at step 814b, the authentication service initializes use of a statistical model, where the statistical model is specific for the customer. At step 816b, the authentication service further provides user behavior data to the statistical model, which, at step 818b, is interpreted in light of the user behavior data. At step 820b, the authentication service generates or creates a secondary authentication credential, such as an authentication code, to be utilized by the customer to complete the multi-factor authentication.

At step 822b, the authentication service transmits the secondary authentication credential to a notification service. At step 824b, the notification service, such as the notification service 120 as described and depicted in reference to FIG. 1, transmits a response to a secondary customer device, wherein the response includes the created secondary authentication credential. At step 826b, the secondary customer device receives the secondary authentication credential. At step 828b, the authentication service confirms the secondary authentication credential by entering or transmitting the authentication code into the designated user interface of the primary customer device. For example, the customer, after receiving the code on the secondary customer device, may enter the code into a display or keypad of the primary customer device, and, the secondary customer device credential may be approved by the authentication service and return the success of approval back to the primary customer device. At step 830b, upon validation of the secondary authentication code, the authentication service allows access to the network resources requested by the user.

Figure 9:
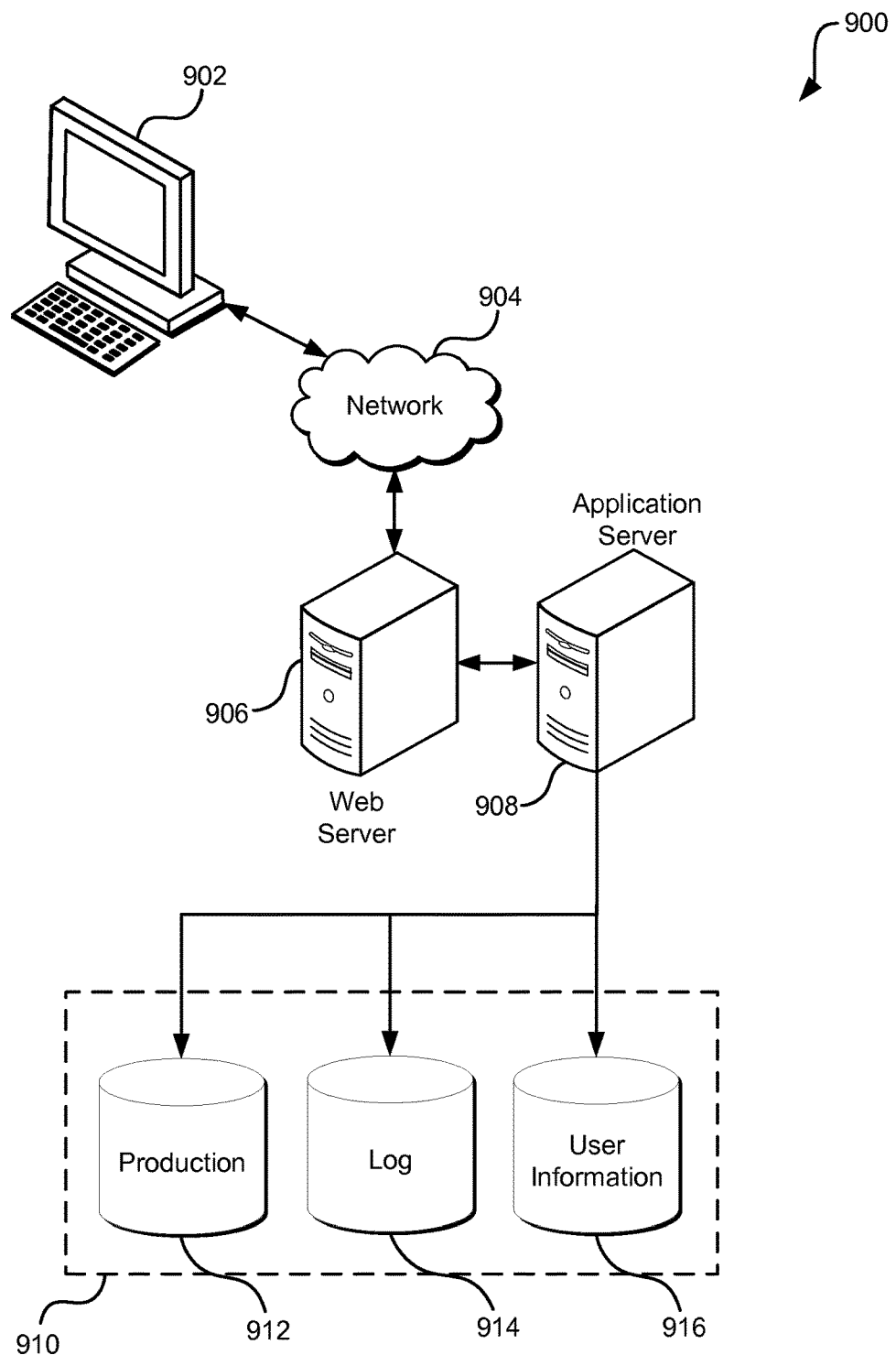
FIG. 9 illustrates an environment in which various embodiments can be implemented.

FIG. 9 shows an illustrated example of an environment 900 in which various embodiments of the present disclosure may be practiced. FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages, or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

Embodiments of the present disclosure can be described in view of the following clauses:

1. A computer-implemented method, comprising:

under the control of one or more computer systems configured with executable instructions, receiving, at a server from a primary device, a request to access a network resource, the request including metadata from the primary device;

obtaining first data from the primary device, related to a current state of the primary device, the first data based at least in part on the metadata;

determining, based at least in part on the first data and a statistical model, a secondary authentication device, wherein the statistical model is constructed based at least in part on historical data and/or user behavior data recorded for the user;

transmitting, from the server to the secondary authentication device, authentication information;

receiving the authentication information via the primary device; and in response to the authentication information received via the primary device matching the transmitted authentication information, enabling access to the network resource.

2. The computer-implemented method of clause 1, wherein the authentication information includes a multi-factor authentication credential.

3. The computer-implemented method of clauses 1 to 2, further comprising:

obtaining data from a plurality of behavior databases of a plurality of different users, wherein the behavior databases include at least the historical data and/or the user behavior data; and identifying similarities, differences, patterns, or any combination thereof among the historical data and/or user behavior data obtained from the primary device and the data obtained from the plurality of behavior databases.

4. The computer-implemented method of clauses 1 to 3, wherein comparing the user behavior data further includes:

identifying contextual data present in both the historical data and/or user behavior data obtained from the primary device and the historical data and/or user behavior data obtained from a user behavior database; and interpreting the statistical model based, at least in part, on the identified contextual data and the historical data and/or user behavior data.

5. A system, comprising at least one computing device configured to implement one or more services, wherein the one or more services are configured to:

receive information corresponding to an identity;

obtain data corresponding to a current state of a set of devices associated with the identity;

determine, based at least in part on the obtained data, a way of enabling authentication information to be provided; and authenticate the identity based at least in part on the identity information and the authentication information.

6. The system of clause 5, wherein the set of devices includes a primary device, and the one or more services are further configured to provide the authentication information to the primary device.

7. The system of clauses 5 or 6, wherein the identity information includes user account information, the user account information identifying whether multi-factor authentication is enabled for a user account associated with the identity and whether the primary device is a trusted device, wherein the trusted device is a device that does not require multi-factor authentication.

8. The system of clause 7, wherein the one or more services are further configured to select a first device of the set of devices and a second device of the set of devices, wherein the identity information is received from the first device and the authentication information is transmitted to the second device.

9. The system of any of clauses 5 to 7, wherein the one or more services are further configured to transmit the authentication information to at least one device of the set of devices without receiving additional data corresponding to the current state of the set of devices.

10. The system of any of clauses 5 to 7 and 9, wherein the data corresponding to the current state of the set of devices associated with an entity includes user behavior data obtained from a user behavior database associated with the entity and user behavior data obtained from the set of devices associated with the entity.

11. The system of clause 10, wherein the user behavior data includes user behavior data from external sources, wherein the external sources are independent from the user behavior data.

12. The system of any of clauses 5 to 7, 9 and 10, wherein the current state of the set of devices includes one or more of an Internet protocol address, a network connection status, a service signal strength, a timestamp, geolocation information, a date, secondary user device selections made in response to previous authentication requests, or a device type.

13. A non-transitory computer-readable storage medium having stored thereon executable instructions that, when executed by one or more processors of a computer system, cause the computer system to at least:

obtain data related to a current state of one or more devices associated with an identity;

utilize the data to determine a way of communicating information necessary for at least one mode of authentication of the identity;

based at least in part on the determined way of communicating, communicate the information;

obtain a credential for an authentication claim of the identity, the credential being dependent on the communicated information; and authenticate the identity based at least in part on the obtained credential.

14. The non-transitory computer-readable storage medium of clause 13, wherein the instructions further comprise instructions that, when executed by the one or more processors, cause the computer system to apply a machine learning algorithm to the data obtained from the primary device, wherein the outcome of the machine learning algorithm is used, at least in part, to select a secondary device, from among identified user devices, for multi-factor authentication.

15. The non-transitory computer-readable storage medium of clause 13 to 14, wherein the instructions further comprise instructions that, when executed by the one or more processors, cause the computer system to apply a machine learning algorithm to an interpretation of a statistical model to the data.

16. The non-transitory computer-readable storage medium of clause 15, wherein the instructions that cause the computer system to apply the machine learning algorithm to the interpretation of the statistical model further include instructions that cause the computer system to determine additional data to be used in the machine learning algorithm to further determine a secondary device based at least in part on data associated with external sources from the one or more devices.

17. The non-transitory computer-readable storage medium of any of clauses 13 to 15, wherein the instructions further comprise instructions that, when executed by the one or more processors, cause the computer system to update the data received from the one or more devices to a user behavior database when the credential is authenticated, wherein the user behavior database includes pre-existing user behavior data based at least in part on previous requests and previous outcomes of the previous requests.

18. The non-transitory computer-readable storage medium of clause 17, wherein the instructions that cause the computer system to update the data in the user behavior database further include instructions that cause the computer system to enable authentication of the credential to occur based at least in part on the updated data.

19. The non-transitory computer-readable storage medium of clauses 13 to 15 and 17, wherein the instructions further comprise instructions that, when executed by the one or more processors, cause the computer system to apply a statistical model to the data, wherein the statistical model is constructed based at least in part on a machine learning algorithm.

20. The non-transitory computer-readable storage medium of clause 19, wherein the instructions that cause the computer system apply the statistical model further include instructions that cause the computer system to identify a set of rules to apply to the statistical model, wherein the rules include a hierarchy for applying different types of the data to the statistical model.

The various embodiments further can be implemented in a wide variety of operating environments, which in some cases can include one or more user computers, computing devices or processing devices, which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, at a server from a primary device, a request to access a network resource, the request including metadata from the primary device;
   obtaining first data from the primary device, related to a current state of the primary device, the first data based at least in part on the metadata;
   determining, based at least in part on the first data, a statistical model, and a plurality of authentication devices associated with a user of the primary device, a secondary authentication device of the plurality of authentication devices having a higher likelihood of receiving authentication information from the service than at least one other authentication device amongst the plurality of authentication devices, wherein the statistical model is constructed based at least in part on historical data or user behavior data associated with the user;

transmitting, from the server to the secondary authentication device, authentication information;

receiving the authentication information via the primary device; and in response to the authentication information received via the primary device matching the transmitted authentication information, enabling access to the network resource.

2. The computer-implemented method of claim 1, wherein the authentication information includes a multi-factor authentication credential.

3. The computer-implemented method of claim 1, further comprising:

obtaining data from a plurality of behavior databases of a plurality of different users, wherein the behavior databases include at least the historical data and/or the user behavior data; and identifying similarities, differences, patterns, or any combination thereof among the historical data and/or user behavior data obtained from the primary device and the data obtained from the plurality of behavior databases.

4. The computer-implemented method of claim 1, wherein comparing the user behavior data further includes:

identifying contextual data present in both the historical data and/or user behavior data obtained from the primary device and the historical data and/or user behavior data obtained from a user behavior database; and interpreting the statistical model based, at least in part, on the identified contextual data and the historical data and/or user behavior data.

5. A system, comprising at least one computing device that implements one or more services, wherein the one or more services at least:

receive information from a first device of a set of devices corresponding to an identity;

obtain data corresponding to a current state of the set of devices associated with the identity;

determine, based at least in part on the obtained data and the set of devices, a manner of enabling authentication information to be provided to a different second device of the set of devices having a higher likelihood of successfully receiving the authentication information than at least one other device of the set of devices; and authenticate the identity based at least in part on the identity information and the authentication information.

6. The system of claim 5, wherein the set of devices includes a primary device, and the one or more services are further configured to provide the authentication information to the primary device.

7. The system of claim 5, wherein the identity information includes user account information, the user account information identifying whether multi-factor authentication is enabled for a user account associated with the identity and whether the primary device is a trusted device, wherein the trusted device is a device that does not require multi-factor authentication.

8. The system of claim 7, wherein the identity information is received from the first device and the authentication information is transmitted to the second device.

9. The system of claim 5, wherein the one or more services are further configured to transmit the authentication information to at least one device of the set of devices without receiving additional data corresponding to the current state of the set of devices.

10. The system of claim 5, wherein the data corresponding to the current state of the set of devices associated with an entity includes user behavior data obtained from a user behavior database associated with the entity and user behavior data obtained from the set of devices associated with the entity.

11. The system of claim 10, wherein the user behavior data includes user behavior data from external sources, wherein the external sources are independent from the user behavior data.

12. The system of claim 5, wherein the current state of the set of devices includes one or more of an Internet protocol address, a network connection status, a service signal strength, a timestamp, geolocation information, a date, secondary user device selections made in response to previous authentication requests, or a device type.

13. A non-transitory computer-readable storage medium having stored thereon executable instructions that, when executed by one or more processors of a computer system, cause the computer system to at least:

obtain data related to a current state of one or more devices associated with an identity;

utilize the data to determine a way of communicating information necessary for at least one mode of authentication of the identity, the mode of authentication having a higher likelihood of successfully communicating the information than at least one other mode of the plurality of modes of authentication;

based at least in part on the determined way of communicating, communicate the information;

obtain a credential for an authentication claim of the identity, the credential being dependent on the communicated information; and authenticate the identity based at least in part on the obtained credential.

14. The non-transitory computer-readable storage medium of claim 13, wherein the instructions further comprise instructions that, when executed by the one or more processors, cause the computer system to apply a machine learning algorithm to the data obtained from the primary device, wherein the outcome of the machine learning algorithm is used, at least in part, to select a secondary device, from among identified user devices, for multi-factor authentication.

15. The non-transitory computer-readable storage medium of claim 13, wherein the instructions further comprise instructions that, when executed by the one or more processors, cause the computer system to apply a machine learning algorithm to an interpretation of a statistical model to the data.

16. The non-transitory computer-readable storage medium of claim 15, wherein the instructions that cause the computer system to apply the machine learning algorithm to the interpretation of the statistical model further include instructions that cause the computer system to determine additional data to be used in the machine learning algorithm to further determine a secondary device based at least in part on data associated with external sources from the one or more devices.

17. The non-transitory computer-readable storage medium of claim 13, wherein the instructions further comprise instructions that, when executed by the one or more processors, cause the computer system to update the data received from the one or more devices to a user behavior database when the credential is authenticated, wherein the user behavior database includes pre-existing user behavior data based at least in part on previous requests and previous outcomes of the previous requests.

18. The non-transitory computer-readable storage medium of claim 17, wherein the instructions that cause the computer system to update the data in the user behavior database further include instructions that cause the computer system to enable authentication of the credential to occur based at least in part on the updated data.

19. The non-transitory computer-readable storage medium of claim 13, wherein the instructions further comprise instructions that, when executed by the one or more processors, cause the computer system to apply a statistical model to the data, wherein the statistical model is constructed based at least in part on a machine learning algorithm.

20. The non-transitory computer-readable storage medium of claim 19, wherein the instructions that cause the computer system apply the statistical model further include instructions that cause the computer system to identify a set of rules to apply to the statistical model, wherein the rules include a hierarchy for applying different types of the data to the statistical model.

\* \* \* \* \*